(12) United States Patent
Ukishima

(10) Patent No.: US 8,854,690 B2
(45) Date of Patent: Oct. 7, 2014

(54) CREATION METHOD OF TOTAL COLOR MATERIAL AMOUNT RESTRICTION TABLE, AND RECORDING MEDIUM

(71) Applicant: FUJIFILM Corporation, Tokyo (JP)

(72) Inventor: Masayuki Ukishima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/037,126

(22) Filed: Sep. 25, 2013

(65) Prior Publication Data

US 2014/0085683 A1    Mar. 27, 2014

(30) Foreign Application Priority Data

Sep. 26, 2012  (JP) ................... 2012-212240

(51) Int. Cl.
*G06F 3/12* (2006.01)
(52) U.S. Cl.
CPC .................... *G06F 3/1219* (2013.01)
USPC ......................... 358/3.23; 358/518

(58) Field of Classification Search
None
See application file for complete search history.

(56) References Cited

U.S. PATENT DOCUMENTS

2005/0068553 A1    3/2005    Otake et al.

FOREIGN PATENT DOCUMENTS

JP    2005-101934 A    4/2005

*Primary Examiner* — Barbara Reinier
*Assistant Examiner* — Christopher D Wait
(74) *Attorney, Agent, or Firm* — Studebaker & Brackett PC

(57) ABSTRACT

According to the present invention, it is possible to adequately restrict the total color material amount from the viewpoint of the second scale which substantially represents a color material amount, and sufficiently produce the color reproducibility which is potentially held by an image formation apparatus. Moreover, since the order of the CMY ratio in the space of the first scale is maintained, it is possible to smoothly secure the connection between tones.

13 Claims, 12 Drawing Sheets

| INDEX | | | | INPUT USAGE RATE [%] | | | | OUTPUT USAGE RATE [%] | | | |
|---|---|---|---|---|---|---|---|---|---|---|---|
| C | M | Y | K | C | M | Y | K | C | M | Y | K |
| 0 | 0 | 0 | 0 | 0 | 0 | 0 | 0 | # | # | # | # |
| 0 | 0 | 0 | 1 | 0 | 0 | 0 | 5 | # | # | # | # |
| 0 | 0 | 0 | 2 | 0 | 0 | 0 | 10 | # | # | # | # |
| ⋮ | ⋮ | ⋮ | ⋮ | ⋮ | ⋮ | ⋮ | ⋮ | ⋮ | ⋮ | ⋮ | ⋮ |
| 0 | 0 | 0 | 20 | 0 | 0 | 0 | 100 | # | # | # | # |
| 0 | 0 | 1 | 0 | 0 | 0 | 5 | 0 | # | # | # | # |
| 0 | 0 | 1 | 1 | 0 | 0 | 5 | 5 | # | # | # | # |
| 0 | 0 | 1 | 2 | 0 | 0 | 5 | 10 | # | # | # | # |
| ⋮ | ⋮ | ⋮ | ⋮ | ⋮ | ⋮ | ⋮ | ⋮ | ⋮ | ⋮ | ⋮ | ⋮ |
| ic | im | iy | ik | ic∗5 | im∗5 | iy∗5 | ik∗5 | # | # | # | # |
| ⋮ | ⋮ | ⋮ | ⋮ | ⋮ | ⋮ | ⋮ | ⋮ | ⋮ | ⋮ | ⋮ | ⋮ |
| 20 | 20 | 20 | 18 | 100 | 100 | 100 | 90 | # | # | # | # |
| 20 | 20 | 20 | 19 | 100 | 100 | 100 | 95 | # | # | # | # |
| 20 | 20 | 20 | 20 | 100 | 100 | 100 | 100 | # | # | # | # |

CREATION METHOD OF TOTAL COLOR MATERIAL AMOUNT RESTRICTION TABLE, AND RECORDING MEDIUM

BACKGROUND OF THE INVENTION

1. Field of the Invention

The present invention relates to a conversion processing technique of color image signals applied to an image formation apparatus that forms an image on a recording medium by the use of a color material. In particular, the present invention relates to a creation method of a total color material amount restriction table used to convert a signal value in order to restrict the color material amount assigned to a recording medium, a program, and a recording medium suitable for the creation.

2. Description of the Related Art

An image formation apparatus such as an ink jet printer and electrophotographic picture creation apparatus forms a desired image on a recording medium by providing a color material (i.e., recording liquid) such as an ink and toner on a recording medium such as paper. At the time of image formation, when the color material is provided to the recording medium in a superimposed manner, there is a case where the recording medium may not sufficiently absorb a color material which is excessively provided. In this case, the patch color reproducibility may be impaired, the decrease in the membrane property due to an excessive color material may be caused, or a paper may be warped due to the excessive color material and a problem may be caused at the time of medium conveyance. Moreover, there is a demand to reduce the used color material amount from the viewpoint of the cost reduction.

Japanese Patent Application Laid-Open No. 2005-101934 discloses a technique of restricting the ink amount by under-color removal processing that replaces a predetermined amount of CMY signals with a K signal for the purpose of improving the reproducibility of an output image while restricting the amount of toner or ink attached per unit area from the viewpoint to prevent the excess provision of color materials (paragraph [0005] in Japanese Patent Application Laid-Open No. 2005-101934).

That is, the invention described in Japanese Patent Application Laid-Open No. 2005-101934 suggests "an image processing apparatus that supplies an image signal to an image formation apparatus that forms an image on a recording medium by a recording liquid, including: a holding unit that holds a restriction value for a total sum of signals levels of image signals output to the image formation apparatus; an input unit that inputs CMYK signals as the image signals; a first comparison unit that compares the total sum of the signal levels of the input CMYK signals and the restriction value; an under-color that performs under-color removal processing of replacing a predetermined amount of CMY signals with a K signal in a case where the total sum of the signal levels of the input CMYK signals exceeds the restriction value; a second comparison unit that compares a total sum of signal levels of the CMYK signals subjected to the under-color removal processing and the restriction value; and an adjustment unit that reduces CMY signals after the under-color removal processing by a same rate such that the total sum after the under-color removal processing is equal to or less than the restriction value in a case where the total sum after the under-color removal processing exceeds the restriction value" (claim 1 of Japanese Patent Application Laid-Open No. 2005-101934).

SUMMARY OF THE INVENTION

The technique described in Japanese Patent Application Laid-Open No. 2005-101934 has a feature that signal conversion is performed such that the total sum of signal levels (or signal values) of image signals does not exceed a restriction value. That is, the restriction value for color material restriction is defined by the scale of the image signals, and performs control based on comparison with the restriction value at signal levels of the image signals.

However, in many print systems (equivalent to "Image formation apparatuses"), the correspondence relationship between the signal level of an image signal and an actual color material amount (which is a value by the scale having a physical meaning, such as the ink amount and the toner amount) is not a linear relationship. Moreover, there is a case where the relationship between the signal level and the color material amount varies in each color of the color material.

Under such a non-linear relationship that varies per color, if the total amount restriction of a color material is simply performed based on the signal level, a physical color material amount may not be sufficiently restricted depending on the tone of the boundary of a color solid or the physical color material amount may be excessively restricted, and there occurs a case where a color reproduction area which is potentially held by a print system cannot be sufficiently produced.

The present invention is made in view of such conditions and it is an object to provide a total color material amount restriction technique of: being able to solve the above problem; enabling appropriate total amount restriction from the viewpoint of the color material amount that is the scale having a physical meaning; and sufficiently producing a color reproduction area which is potentially held by a print system. Moreover, at this time, it is an object to provide a creation method of a total color material amount restriction table to solve a problem that tones are not smoothly connected due to a non-linear relationship between the signal level and the color material amount (e.g., tone jump), and a program that causes a computer to realize the table creation function.

To solve the above-mentioned problem, the following invention is provided.

(First aspect): A creation method of a total color material amount restriction table according to the first aspect is a creation method of a total color material amount restriction table that defines a conversion relationship to convert an input CMYK signal prior to total color material amount restriction to an output CMYK signal subjected to total color material amount restriction, in order to restrict a total color material amount provided to a recording medium in an image formation apparatus that forms an image on the recording medium using color materials of cyanogen (C), magenta (M), yellow (Y) and black (K), including: a step of acquiring a first converter that calculates a value of a color material amount represented by a second scale with a physical meaning indicating an amount of a color material provided to the recording medium by the image formation apparatus, from a signal value from the signal value represented by a first scale that defines a used amount of each of the color materials of C, M, Y, and K; a step of acquiring a second converter that calculates a signal value represented by the first scale from the value of the color material represented by the second scale; a step of setting a total color material amount upper limit value represented by the second scale; and a table creation processing step of creating the total color material amount restriction table that defines an output CMYK signal with a total color material amount equal to or less than the total color material amount upper limit value with respect to an input CMYK signal, using the first converter, the second converter and the total color material amount upper limit value, in which: the table creation processing step includes: a first processing step of deciding an output CMYK signal corresponding to an input CMYK signal when each of signal values of C, M, and Y in the input CMYK signal is a maximum value in a domain of the signal value defined by the first scale; a second processing step of deciding a K value of an output CMYK signal corresponding to an input CMYK signal using one or two kinds of color materials among C, M, and Y; a third processing step of deciding a CMY value of an output CMYK signal corresponding to an input CMYK signal using one kind of color material among C, M, and Y; a fourth processing step of deciding a CMY value of an output CMYK signal corresponding to an input CMYK signal using two kinds of color materials among C, M, and Y; a fifth processing step of deciding a CMYK value of an output CMYK signal corresponding to an input CMYK signal using three kinds of color materials among C, M, and Y; and the fifth processing step includes processing that defines an output CMYK signal with a total color material amount equal to or less than the total color material amount upper limit value, using a total color material amount value calculated by first interpolation processing that performs a first interpolation calculation in a space of a total color material amount by the second scale and a CMYK value calculated by second interpolation processing that performs a second interpolation calculation in a space of the first scale.

According to this aspect, it is possible to adequately restrict the total color material amount from the viewpoint of the second scale having a physical meaning and sufficiently produce a color reproduction area which is potentially held by an image formation apparatus. Moreover, the connection between tones becomes smooth.

(Second aspect): In the creation method of the total color material amount restriction table according to the first aspect, in which the first processing step can include processing that decides an output CMYK signal in which a total color material amount by the output CMYK signal is the total color material amount upper limit value while maintaining a CMY ratio of the input CMYK signal.

(Third aspect): In the creation method of the total color material amount restriction table according to one of the first aspect and the second aspect, in which the fifth processing step can include: a step of setting a target value of a total color material amount corresponding to an input CMYK signal by the first interpolation processing performed in a space of the total color material amount by the second scale; a step of calculating a tentative output CMYK signal corresponding to an input CMYK signal by the second interpolation processing performed in the space of the first scale; a step of determining a K value in the tentative output CMYK signal as the K value of the CMYK signal; and a step of deciding a CMY value such that a total color material amount matches the target value by adjusting a remaining CMY value in the tentative output CMYK signal.

(Fourth aspect): In the creation method of the total color material amount restriction table according to one of the first to third aspects, in which the first processing step can include processing of defining a K value of an output CMYK signal when all signal values of C, M, Y, and K in an input CMYK signal are the maximum value in the domain by the first scale, as the maximum value, and adjusts a remaining CMY value to decides an output CMYK signal such that a total color material amount by the output CMYK signal matches the total color material amount upper limit value.

(Fifth aspect): In the creation method of the total color material amount restriction table according to one of the first to fourth aspects, in which it is preferable that the first processing step includes processing that sets a K value of an output CMYK signal such that a K value of a corresponding output CMYK signal increases as a K value of an input CMYK signal increases.

(Sixth aspect): In the creation method of the total color material amount restriction table according to one of the first to fifth aspects, in which the second processing step can include processing that decides a value equivalent to a K value of an input CMYK signal as a K value of an output CMYK signal.

(Seventh aspect): In the creation method of the total color material amount restriction table according to one of the first to sixth aspects, in which it is preferable that: the third processing step includes processing that decides an output CMYK signal when a signal value of the one kind of color material in the input CMYK signal is the maximum value of the domain by the first scale; and a minimum value of the domain is set to each signal value with respect to two colors other than the one kind of color material in the CMY value among the output CMYK signal, and a maximum value is set to the signal value of the one kind of color material within a range in which a total color material amount falls below the total color material amount upper limit value.

(Eighth aspect): In the creation method of the total color material amount restriction table according to one of the first to seventh aspects, in which the third processing step can include processing that defines a CMY value of an output CMYK signal by performing a third interpolation calculation in the space of the first scale.

(Ninth aspect): In the creation method of the total color material amount restriction table according to one of the first to eighth aspects, in which it is preferable that: the fourth processing step includes processing that decides an output CMYK signal when a signal value of a first color material that is one of the two kinds of color materials in the input CMYK signal is the maximum value of the domain by the first scale; a minimum value of the domain is set to an output signal value with respect to one color other than the two kinds of color materials in a CMY value in the output CMYK signal, as for an output signal value of the first color material, the maximum value decided in the third processing step is used as a first candidate value, and, as for an output signal value of a color material different from the first color material in the two kinds of color materials, the output signal value decided in the third processing step with respect to the input signal value is used as a second candidate value; the first candidate value and the second candidate value are adopted as output signal values in a case where a total color material amount of an output CMYK value does not exceed the total color material amount upper limit value when the first candidate value and the second candidate value are used; and the fourth processing step includes processing that decides a CMY value of the output CMYK signal such that the total color material amount matched the total color material amount upper limit value while maintaining a ratio between the first candidate value and the second candidate value, in a case where the total color material amount of the output CMYK value exceeds the total color material amount upper limit value when the first candidate value and the second candidate value are used.

(Tenth aspect): In the creation method of the total color material amount restriction table according to one of the first to ninth aspects, in which the fourth processing step can include processing that defines a CMY value of an output CMYK signal by performing a fourth interpolation calculation on the space of the first scale.

(Eleventh aspect): In the creation method of the total color material amount restriction table according to one of the first to tenth aspects, in which a usage rate of a color material is used as the first scale and a signal value indicating a usage rate of each of the color materials of C, M, Y, and K is defined between 0 and 100.

(Twelfth aspect): In the creation method of the total color material amount restriction table according to one of the first to eleventh aspects, in which a color material amount represented by a volume of a color material is used as the second scale and the total color material amount upper limit value can indicate an upper limit value of the volume of the color material provided per unit area.

(Thirteenth aspect): There is provided a non-transitory recording medium in which computer readable code of a program is stored, wherein the program is a program that causes a computer to realize a function of creating a total color material amount restriction table that defines a conversion relationship to convert an input CMYK signal prior to total color material amount restriction to an output CMYK signal subjected to total color material amount restriction, in order to restrict a total color material amount provided to a recording medium in an image formation apparatus that forms an image on the recording medium using color materials of cyanogen (C), magenta (M), yellow (Y) and black (K), where the function includes: a step of acquiring a first converter that calculates a value of a color material amount represented by a second scale with a physical meaning indicating an amount of a color material provided to the recording medium by the image formation apparatus, from a signal value from the signal value represented by a first scale that defines a used amount of each of the color materials of C, M, Y, and K; a step of acquiring a second converter that calculates a signal value represented by the first scale from the value of the color material represented by the second scale; a step of setting a total color material amount upper limit value represented by the second scale; and a table creation processing step of creating the total color material amount restriction table that defines an output CMYK signal with a total color material amount equal to or less than the total color material amount upper limit value with respect to an input CMYK signal, using the first converter, the second converter and the total color material amount upper limit value, in which: the table creation processing step includes: a first processing step of deciding an output CMYK signal corresponding to an input CMYK signal when each of signal values of C, M, and Y in the input CMYK signal is a maximum value in a domain of the signal value defined by the first scale; a second processing step of deciding a K value of an output CMYK signal corresponding to an input CMYK signal using one or two kinds of color materials among C, M, and Y; a third processing step of deciding a CMY value of an output CMYK signal corresponding to an input CMYK signal using one kind of color material among C, M, and Y; a fourth processing step of deciding a CMY value of an output CMYK signal corresponding to an input CMYK signal using two kinds of color materials among C, M, and Y; and a fifth processing step of deciding a CMYK value of an output CMYK signal corresponding to an input CMYK signal using three kinds of color materials among C, M, and Y, and the fifth processing step includes processing that defines an output CMYK signal with a total color material amount equal to or less than the total color material amount upper limit value, using a total color material amount value calculated by first interpolation processing that performs an interpolation calculation in a space of a total color material amount by the second scale and a CMYK value calculated by second interpolation processing that performs an interpolation calculation in a space of the first scale.

Features similar to those of the second to twelfth aspects can be arbitrarily combined to the program stored in the recording medium of the thirteenth aspect.

According to the present invention, it is possible to adequately restrict the total color material amount from the viewpoint of the second scale which substantially represents a color material amount, and sufficiently produce the color reproducibility which is potentially held by an image formation apparatus. Moreover, since the order of the CMY ratio in the space of the first scale is maintained, it is possible to smoothly secure the connection between tones.

DETAILED DESCRIPTION OF THE PREFERRED EMBODIMENTS

In the following, embodiments to implement the present invention are explained in detail according to the accompanying drawings.

Figure 1:
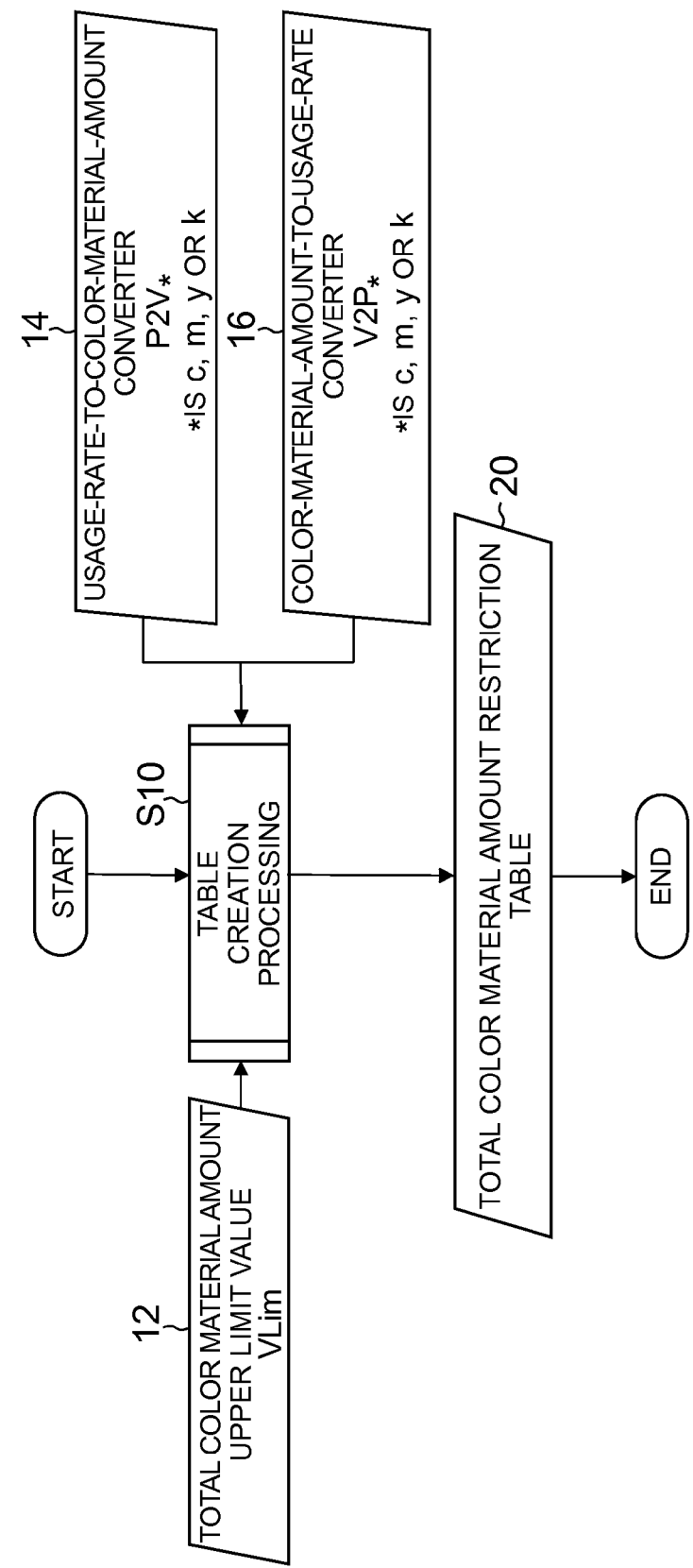
FIG. 1 is a flowchart indicating an outline of a creation method of a total color material amount restriction table according to an embodiment of the present invention.

FIG. 1 is a flowchart indicating an outline of a creation method of a total color material amount restriction table according to an embodiment of the present invention. As illustrated in the figure, table creation processing (step S10) according to the present embodiment receives data of total color material amount upper limit value VLim (reference numeral 12), a usage-rate-to-color-material-amount converter 14 (corresponding to "first converter") and a color-material-amount-to-usage-rate converter 16 (corresponding to "second converter") as an input, and, as the processing result, creates a total color material amount restriction table 20.

The total color material amount restriction table 20 is a conversion table for signal conversion, which associates the CMYK value subjected to total color material amount restriction (i.e., output CMYK signal) with the CMYK value prior to total color material amount restriction (i.e., input CMYK signal), and denotes a CMYK-to-CMYK four-dimensional conversion lookup table (LUT).

The usage-rate-to-color-material-amount converter 14 is a conversion module that defines the conversion relationship for conversion from the value represented by the scale of the usage rate indicating the used color material amount to the value represented by the scale of the color material amount having a physical meaning, with respect to each color material of CMYK. Such a converter is prepared for each color of CMYK. In this example, the usage rate is used as the first scale that describes the used color material amount, and the usage rate is represented by the percentage value (the domain is in the range of 0 to 100). This usage rate describes the signal level of an image signal and denotes the scale without a direct physical meaning. Meanwhile, the color material amount as the second scale that describes the used color material amount denotes the scale having a physical meaning like the volume and mass, and so on. In this example, an explanation is given with an assumption that the color material amount is represented by the volume.

Here, in FIG. 1, although the usage-rate-to-color-material-amount converter 14 is represented by reference character "P2V*," reference character "P2V" denotes encoding display of "percent to volume" that shows conversion from the value of percent (%) indicating the usage rate into the value of ink volume indicating the color material amount. Additional character "*" shows a symbolic-character indicating four kinds of suffixes of c, m, Y, and K.

If conversion by the usage-rate-to-color-material-amount converter 14 is assumed as "forward conversion," conversion by the color-material-amount-to-usage-rate converter 16 corresponds to "backward conversion." The color-material-amount-to-usage-rate converter 16 is a conversion module that defines the conversion relationship for conversion from the value represented by the scale of a color material amount to the value represented by the scale of the usage rate, with respect to each color material of CMYK. Such a converter is prepared for each color of CMYK. The usage-rate-to-color-material-amount converter 14 is written by the sign of "V2P*."

As data and module used for the table creation processing (step S10) when the total color material amount restriction table 20 is created by the presents embodiment, data of total color material amount upper limit value VLim (reference numeral 12), the usage-rate-to-color-material-amount converter (P2V*) 14 that converts each color material of CMYK from the usage rate to the color material amount and the color-material-amount-to-usage-rate converter (V2P*) 16 that performs conversion from the color material amount to the usage rate are input.

Figure 2:
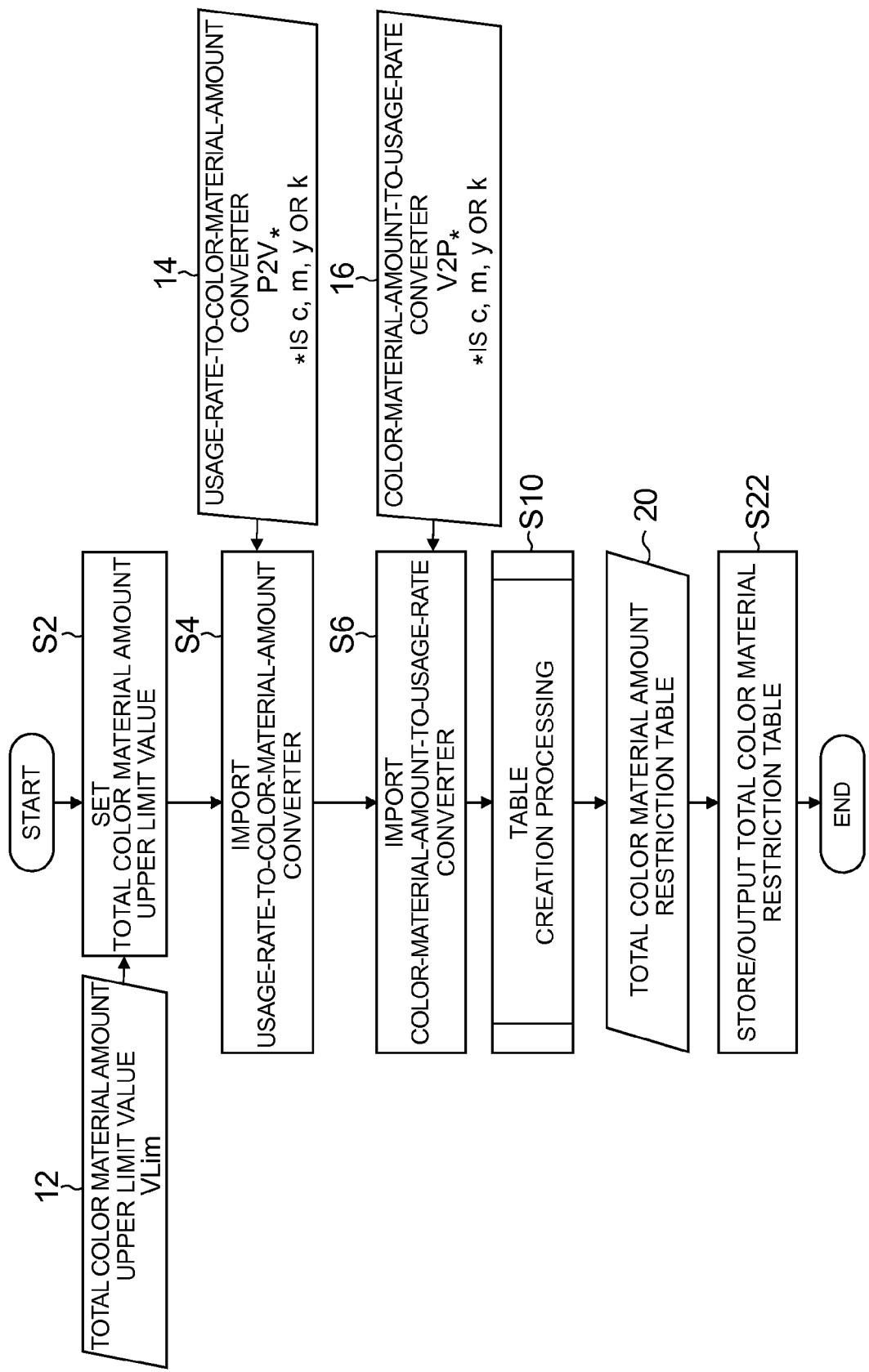
FIG. 2 is a flowchart indicating more detailed procedure of a creation method of a total color material amount restriction table according to an embodiment of the present invention.

FIG. 2 is a flowchart indicating more detailed procedure of a creation method of the total color material amount restriction table according to an embodiment of the present invention. FIG. 2 includes content of the flowchart explained in FIG. 1, the same reference numerals are assigned to the same components as the components (including operations)

explained in FIG. 1 and their explanation is omitted. As illustrated in FIG. 2, processing that sets the total color material amount upper limit value (step S2, "setting operation of the total color material amount upper limit value"), processing that acquires the usage-rate-to-color-material-amount converter 14 (step S4, "acquisition operation of the first converter") and processing that acquires the color-material-amount-to-usage-rate converter 16 (step S6, "acquisition operation of the second converter") are performed as processing before the table creation processing (step S10) is performed. Here, the processing order of steps S2 to S6 is not specifically limited and can be adequately changed.

The table creation processing (step S10) is performed using the data and module (reference numerals 12, 14 and 16) imported in steps S2 to S6. The total color material amount restriction table 20 generated by the table creation processing (step S10) is stored in a storage apparatus (i.e., storage unit such as an internal memory, hard disk drive (HDD), memory card, magnetic disk and optical disc) (step S22). Moreover, instead of or together with this storage operation, it is possible to output the total color material amount restriction table 20 to the outside through a data output terminal or a communication interface, and so on (output operation).

<Explanation of Terms and Signs>

Before content of the table creation processing is described in detail, terms and signs used in the present embodiment are explained.

(1) Regarding "Color Material"

The present embodiment is directed to a print system (corresponding to "image formation apparatus") that uses four kinds of color materials of cyanogen (C), magenta (M), yellow (Y) and black (K). The type (e.g., printing method) of the print system is not limited, and it is possible to apply the print system without depending on the type of the print system as long as the above-mentioned four kinds of color materials are used. The print system includes, for example, an offset printing machine, an electrophotography and an ink jet printer. That is, the "color material" may be an ink or a toner according to the print system.

(2) Regarding "Usage Rate"

The "usage rate" is one scale indicating the used color material amount. In this embodiment, the color material usage rate is represented by percentage according to the format of ICC (International Color Consortium) profile. That is, 0% is assumed in a case where a color material is not used at all, and 100% is assumed in a case where it is used at maximum.

For example, when the numeral values that can be input in the print system are integers of 8 bits (i.e., 0 to 255), it is possible to show the color material usage rate by a linear equation between 0 assumed as 0% and 255 assumed as 100%. When an input value is assumed to be "i," usage rate "ai" is as shown in Equation (1).

[Equation 1]

$$a_i = 100 \times \frac{i}{255} \quad \text{Equation (1)}$$

The color material usage rate is not limited to the expression defined in Equation 1, and, for example, can be defined by the halftone dot area ratio represented by the Murray-Davies equation. In the print system, the concentration of a patch in which a monochrome color material is printed on a paper by certain input value "i" is measured, and, when the concentration at that time is "Di," halftone dot area ratio "ai" is represented by the Murray-Davies equation like following equation 2.

[Equation 2

$$a_i = 100 \times \frac{1 - 10^{-(D_i - D_0)}}{1 - 10^{-(D_{100} - D_0)}} \quad \text{Equation (2)}$$

Here, $D_0$ represents the concentration of a medium itself (i.e., a color material is not deposited) and $D_{100}$ represents the concentration in a case where the color material is used at maximum. Also, the halftone dot area ratio "ai" represented by the Murray-Davies equation is a theoretical value calculated by the above-mentioned equation and does not ensure that a color material deposited on a medium is physically distributed at area ratio ai.

Here, although examples of two usage rates represented by Equation (1) and Equation (2) are presented, the usage rate is one scale indicating the used color material amount and is not limited to the above-mentioned examples.

Moreover, the print system has a function to correct a monochrome color that has been changed by the machine difference or over time into an intended color, and it is possible to define the usage rate with respect to a value after the correction.

(3) Regarding "Color Material Amount"

Although the color material amount denotes one scale indicating the used color material amount, it is assumed that the color material amount has some substantial physical meanings as a difference with the usage rate. For example, the color material amount of a color material can be represented by volume. As an example, in an ink jet printer, the volume per droplet ejected from a nozzle is measured in advance by an adequate method, and, from the number of droplets ejected to a certain area in response to the usage rate that is input in the printer next, it is possible to calculate the color material amount (i.e. volume) corresponding to the usage rate. By using such a scale of a color material amount, it is possible to manage the used amount of the color material with a physical meaning. By using the used amount (i.e., color material amount) having a physical meaning, it is possible to make a design in which the conveyance performance at the time of printing or the membrane property of printed elements are ensured accurately, or it is possible to accurately estimate the color material cost of the print system.

(4) Relationship Curve Between Usage Rate and Color Material Amount

Figures 3, 4:
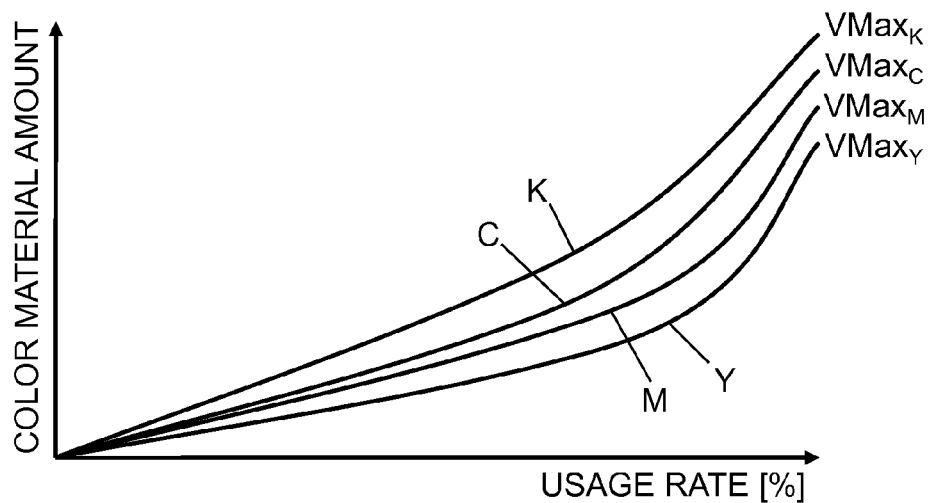
FIG. 3 illustrates a diagram illustrating an example of the relationship between the usage rate and color material amount.
FIG. 4 illustrates a diagram illustrating a concept of a total color material amount restriction table.

FIG. 3 illustrates one example of the relationship between the usage rate and the color material amount which are defined in the present embodiment as above. As illustrated in FIG. 3, generally, there is a non-linear relationship between the usage rate and the color material amount. Moreover, the shape of the relationship curve may vary between C, M, Y, and K. In the present embodiment, the color material amounts at a usage rate of 100% in C, M, Y, and K are labeled with $VMax_C$, $VMax_m$, $VMax_Y$, $VMax_K$, respectively.

From the relationship curve illustrated in FIG. 3, it is possible to create the usage-rate-to-color-material-amount converter 14 and the color-material-amount-to-usage-rate converter 16. That is, in the curve in FIG. 3, since the correspondence relationship between the value of the usage rate and the value of the color material amount is specified, it is possible to perform conversion from the usage rate to the color material amount (i.e., forward conversion) and conversion from the color material amount to the usage rate (i.e., backward conversion) by the use of this relationship property.

(5) Regarding "Usage-Rate-to-Color-Material-Amount Converter"

The usage-rate-to-color-material-amount converter 14 (i.e., the first converter) is a function to calculate the color material amount from the usage rate. In the present embodiment, it is assumed that the conversion relationship (FIG. 3) to find the color material amount from the usage rate is recognized in advance. In the present embodiment, the converters with respect to color materials of C, M, Y, and K are labeled with function names of P2Vc, P2Vm, P2Vy and P2Vk, respectively.

(6) Regarding "Color-Material-Amount-to-Usage-Rate Converter"

The color-material-amount-to-usage-rate converter 16 (i.e., the second converter) is a function to calculate the usage rate from the color material amount, and denotes an inverse function of the sage-rate-to-color-material-amount converter. In the present embodiment, it is assumed that this relationship (FIG. 3) is recognized in advance. In the present embodiment, converters with respect to color materials of C, M, Y, and K are labeled with function names of V2Pc, V2Pm, V2Py and V2Pk, respectively.

(7) Regarding "Total Color Material Amount Upper Limit Value"

In a case where all of color materials of C, M, Y, and K are used at a usage rate of 100%, the total color material amount (i.e., total amount of CMYK) assigned to a recording paper (i.e., recording medium) becomes 400% on the display of the usage rate. In a case where four color materials are voluminously used in this way, since the recording paper cannot absorb the color materials that are assigned in a superimposed manner, accurate patch color reproduction may not be performed, the decrease in the membrane property due to excessive color materials may be caused, or a paper may be warped due to the excessive color materials and a problem may be caused at the time of medium conveyance.

Therefore, in the present embodiment, a mechanism, which sets the upper limit value of the used color material amount (i.e., total color material amount upper limit value) by the scale of the color material amount (i.e., scale having a physical meaning) and prevents printing from being performed over the upper limit value, is introduced into the print system. By this means, it is possible to perform stable printing.

The present embodiment uses the "total color material amount upper limit value" that defines the upper limit value of the used color material amount by the color material amount having a physical meaning. The total color material amount upper limit value described herein is specified as the upper limit value of the total color material amount represented by the sum value of color material amounts provided per unit area (i.e., the sum of four color materials of CMYK). For example, "5 pL (pico liter)" per pixel is specified as the total color material amount upper limit value. An area of one pixel can be specified from the recording resolution of the print system (i.e., image formation apparatus). Here, the total color material amount upper limit value can be changed according to the type of a paper used as a recording medium. In the present embodiment, the set total color material amount upper limit value is labeled with VLim.

(8) Regarding "Total Color Material Amount Restriction Table"

The total color material amount restriction table 20 is an artifact created by table creation processing of the present embodiment (step S10 in FIGS. 1 and 2). FIG. 4 illustrates a concept of the total color material amount restriction table 20. When the color material usage rate is changed at intervals of 5% like 0, 5, 10, . . . 100% for each color material, since there are 21 combinations every color material and there are four kinds of color materials, there are the fourth power of 21 ($21^4$)=194481 kinds of combinations as a whole.

In the present example, each of these combinations is referred to as "input usage rate set." In the input usage rate sets, there are combinations that exceed the total color material amount upper limit value.

The total color material amount restriction table 20 is a table that associates the output usage rate set with each input usage rate set. That is, in FIG. 4, it is an object of the table creation processing (step S10) to decide the value of the "#" part of each output usage rate set, which is shown in the column of output usage rate [%].

Here, it is a condition that it does not exceed the total color material amount upper limit value in all of the output usage rate sets. That is, it is a condition that the color material amount sum by the CMYK values defined by the output usage rate set is equal to or less than the total color material amount upper limit value. Moreover, it is also important that the value of the output usage rate set is smoothly changed according to the change of the value of the input usage rate set, in order to prevent tone jump from being caused.

Therefore, even in a case where the input usage rate set does not exceed the total color material amount upper limit value, the value of the corresponding output usage rate set may be different from the input usage rate set. Moreover, since the color reproduction area becomes small when the total color material amount limitation is applied, it is desirable to design the total color material amount restriction table 20 so as to minimize the decrease in the color reproduction area.

In the present embodiment, information of the total color material amount restriction table is stored in a five-dimensional array of element numbers of 21×21×21×21×4, and this array name is labeled with L. Access to the elements of the array is performed by the index and the color ID. The index is labeled with ic, im, iy and ik with respect to C, M, Y, and K respectively, which can take one of values of 0, 1, 2, . . . and 20. The color ID is labeled with c_id and can take one of values of 0, 1, 2 and 3. The values of 0, 1, 2 and 3 of color ID (c_id) represent C, M, Y, and K, severally. It is possible to perform access by designating L[ic, im, iy, ik, c_id] for the array elements by the use of the index and the color ID.

For example, in the table in FIG. 4, in the case of accessing the address of "#" of the array element indicated by a reference numeral of 23, L[0, 0, 1, 2, 2] is written. Moreover, the CMYK values of the input usage rate set corresponding to the index can be calculated from a calculation formula of (C, M, Y, K)=(ic*5, im*5, iy*5, ik*5). Here, a sign of "*" in this formula is an operator indicating multiplication.

In the present embodiment, although the interval of the usage rate of the total color material amount restriction table 20 is set to 5%, it is not limited to the interval of the value of 5% when the invention is implemented. For example, in a case where it is set to the interval of 10%, array L becomes a fifth-dimensional array of element numbers of 11×11×11×11×4 and the index takes one of values of 0, 1, 2, . . . and 10, and the value of the input usage rate set corresponding to the index can be calculated by a calculation formula of (ic*10, im*10, iy*10, ik*10). By setting the interval to a higher value, there is an advantage that it is possible to shorten the time required for the table creation processing (step S10) and reduce the size of the file of the total color material amount restriction table, and so on. Meanwhile, by setting the interval to a smaller value, there is an advantage that it is possible to enhance the interpolation accuracy when performing total color material amount restriction processing of an arbitrary input usage rate set by the use of the total color material amount restriction table later.

(9) Regarding "Zero-Order Color," "First Color," "Second Color," "Third Color" and "Fourth Color"

Classification into the zero-order color, the first color, the second color, the third color and the fourth color is performed depending on how many kinds of color materials are used to represent a focused color. The zero-order color shows a case where no color material is used, that is, it shows a color of a paper in a case where the paper is selected as a medium. A color which is represented using only one kind of color material denotes the first color, a color which is represented using two kinds of color materials denotes the second color, a color which is represented using three kinds of color materials denotes the third color and a color which is represented using four kinds of color materials denotes the fourth color.

(10) Regarding "Quasi-Zero-Order Color," "Quasi-First Color," "Quasi-Second Color" and "Quasi-Third Color"

Terms of the quasi-zero-order color, the quasi-first color, the quasi-second color and the quasi-third color are defined in the present embodiment. The quasi-zero-order color, the quasi-first color, the quasi-second color and the quasi-third color are defined depending on the existence/nonexistence of color materials of CMY except for K in four kinds of color materials of CMYK. That is, when a certain color is focused, without depending on whether K is used or K is not used, the quasi-zero-order color is decided in a case where none of CMY is used, the quasi-first color is decided in a case where only one kind of three color materials of CMY is used, the quasi-second color is decided in a case where two kinds of them are used, and the quasi-third color is decided in a case where three kinds of them are used.

Figure 5:
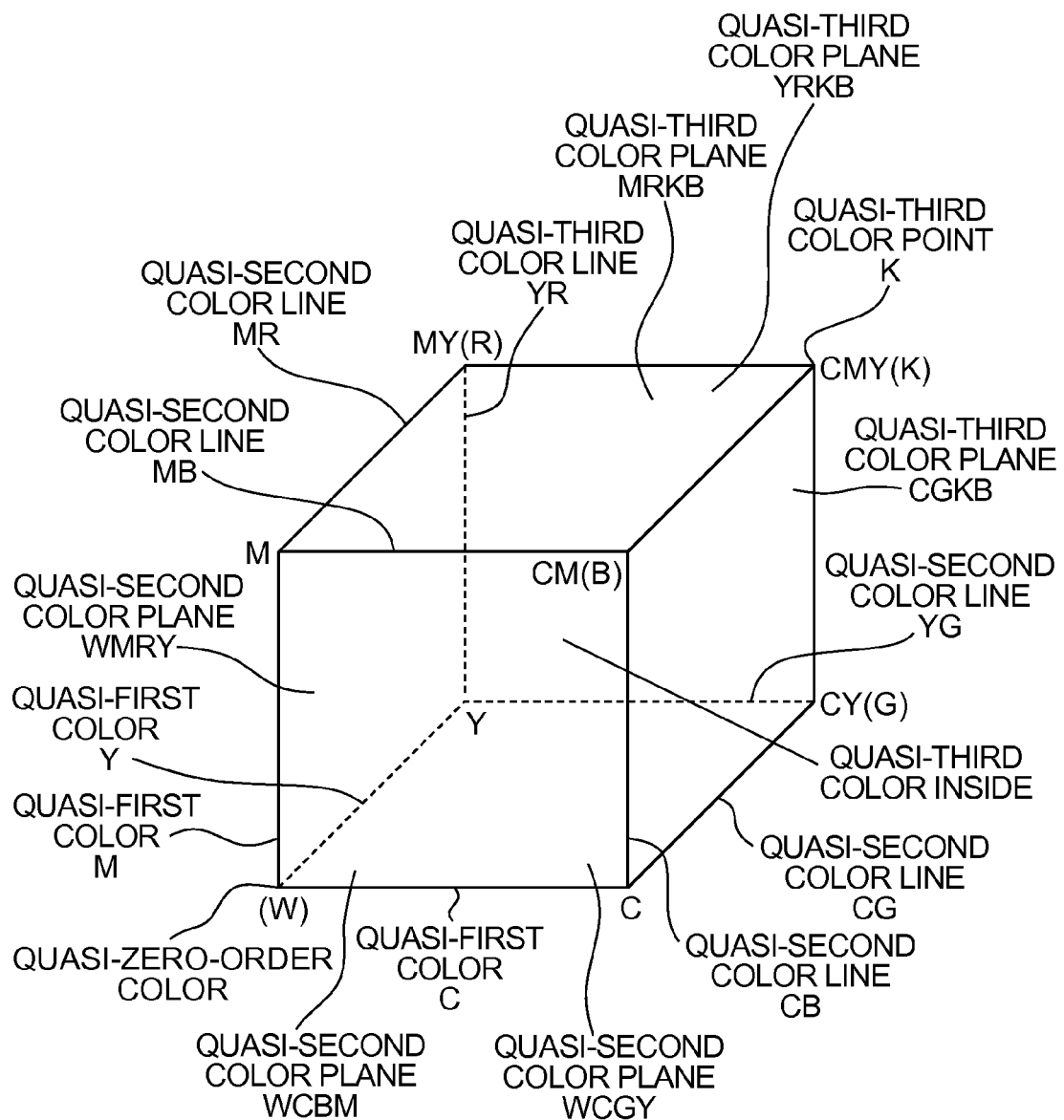
FIG. 5 illustrates a diagram indicating a three-dimensional partial color solid by the CMY subspace when K is fixed to a certain value with respect to the CMYK four-dimensional color space.

With respect to the four-dimensional color space of CMYK, when K is fixed to a certain value and a subspace of only remaining CMY is considered, it is possible to illustrate it as a three-dimensional partial color solid, which is illustrated in FIG. 5. In FIG. 5, the quasi-zero-order to quasi-third colors are illustrated respectively.

(11) Regarding "4C100" and "Quasi-3C100"

Here, 4C100 stands for a color when the input usage rate is (C, M, Y, K)=(100, 100, 100, 100). Also, quasi-3C100 stands for a color when the input usage rate is (C, M, Y, K)=(100, 100, 100, *). Here, "*" is an arbitrary value between 0 and 100.

<Regarding Table Creation Processing>

Next, content of the table creation processing (step S10 in FIGS. 1 and 2) is explained.

Figure 6:
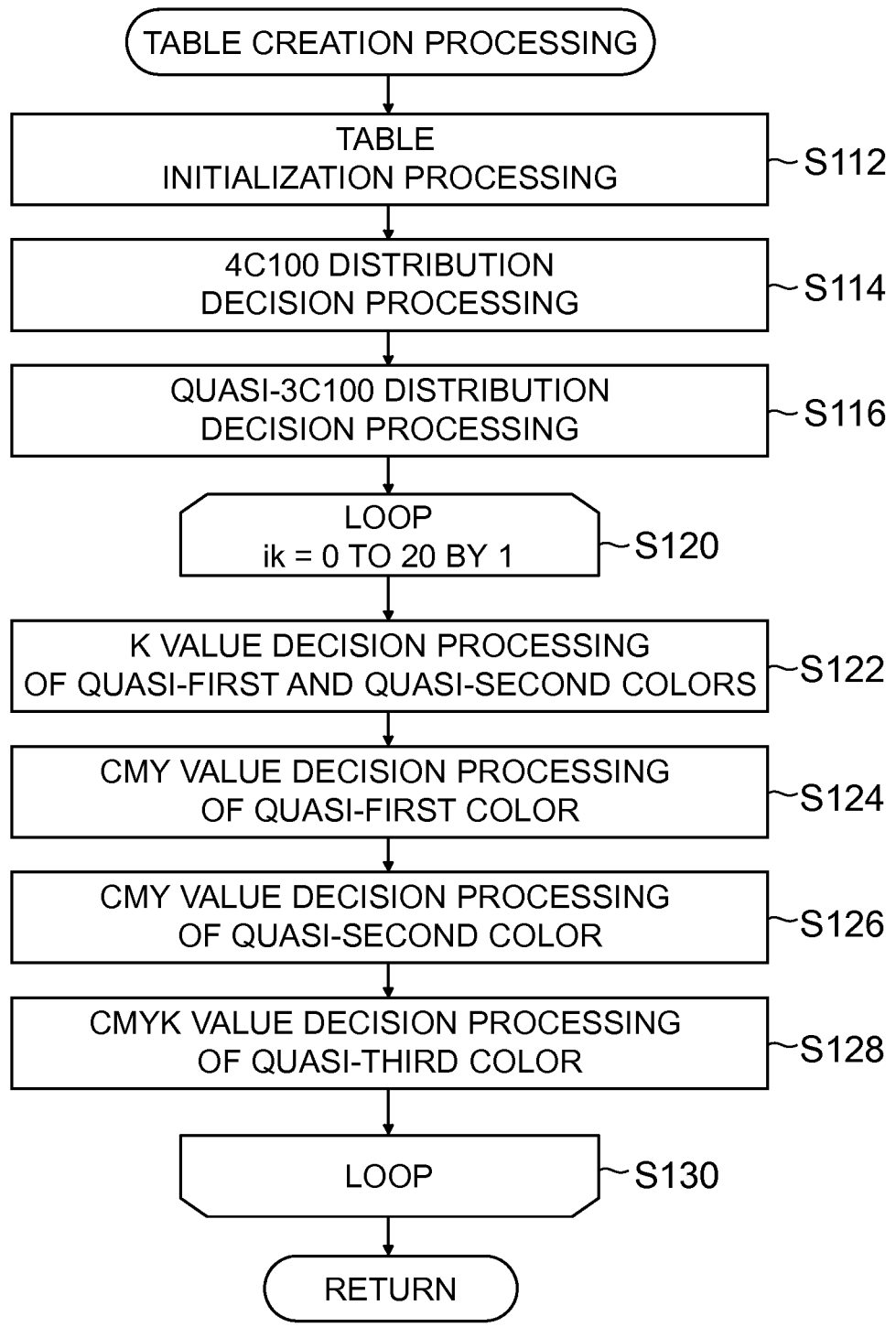
FIG. 6 is a flowchart indicating content of table creation processing.

FIG. 6 is a flowchart indicating content of the table creation processing. In the following, each step (or operation) illustrated in FIG. 6 is described.

(1) Table Initialization Processing

In the table creation processing, first, table initialization processing is performed (step S112).

In the table initialization processing, L[ic, im, iy, ik, c_id] =0 is substituted into all indices and color ID's.

(2) 4C100 Distribution Decision Processing

Next, 4C100 distribution decision processing is performed (step S114). Here, processing that decides the output usage rate of 4C100 is performed. That is, it defines the usage rate set illustrated in the bottom column of the output usage rate in the table of FIG. 4. Although the input usage rate of 4C100 is (C, M, Y, K)=(100, 100, 100, 100), it leads to a total usage rate of 400% if this goes on, which makes the color material amount excessive. Therefore, in the present embodiment, it is considered to fix the output usage rate of K to 100 and decrease the remaining usage rates of CMY to minimize the decrease in the reproduction concentration range. When the ratio of the usage rates of CMY is maintained (or kept) between the input usage rate and the output usage rate, the output usage rate is (C, M, Y, K)=(x, x, x, 100). Here, "x" represents a usage rate and does not represent a color material amount itself.

When the value of "x" is converted into "color material amount" and expressed using the usage-rate-to-color-material-amount converter 14 (see FIG. 1), amount total color material amount $V_{4C100}$ of 4C100 is expressed by following Equation (3).

[Equation 3]

$$V_{4C100} = P2V_c(x) + P2V_m(x) + P2V_y(x) + P2V_k(100)$$
$$= P2V_c(x) + P2V_m(x) + P2V_y(x) + VMax_k$$

Equation (3)

Here, by matching total color material amount $V_{4C100}$ to total color material amount upper limit value VLim, it is possible to minimize the decrease in the color reproduction area. Therefore, it only has to calculate "x" that satisfies following Equation (4).

[Equation 4]

$$VLim - VMax_k = P2V_c(x) + P2V_m(x) + P2V_y(x)$$

Equation (4)

For example, "x" that satisfies Equation (4) can be calculated by performing non-linear optimization under the restriction of domain 0≤x≤100 of "x." For the non-linear optimization with restriction, a known method such as a downhill simplex method to which a penalty function method is applied may be used. An operation of such non-linear optimization can be performed using a computer.

(3) Quasi-3C100 Distribution Decision Processing

Next, quasi-3C100 distribution decision processing is performed (step S116). This processing denotes processing that decides the output usage rate set with respect to the input usage rate set other than 4C100 in quasi-3C100. The target input usage rate sets are (C, M, Y, K)=(100, 100, 100, 0), (100, 100, 100, 5), (100, 100, 100, 10), . . . (100, 100, 100, 95). Although a method of deciding the output usage rate sets for these is arbitrary, the following idea is adopted in the present embodiment.

That is, the output usage rate of K is decided first and equivalence usage rate "x" is set to each of CMY next, such that the total color material amount at this time matches VLim at this time. The output usage rate of K is set to a smaller value when the K value of the input usage rate set is smaller. For example, the output usage rate of K with respect to input usage rate set (C, M, Y, K)=(100, 100, 100, 0) is set to 80, and, as the input usage rate of K is increased, the output usage rate of K is increased like 81, 82, 83, . . . and 99. Regarding the remaining output usage rates of CMY, for example, when the output usage rate of K is 80, "x" that satisfies following Equation (5) may be searched for by non-linear optimization.

[Equation 5]

$$VLim - P2V_k(80) = P2V_c(x) + P2V_m(x) + P2V_y(x)$$

Equation (5)

Naturally, the output usage rate of K with respect to input usage rate set (C, M, Y, K)=(100, 100, 100, 0) is not limited to "80" and can be adjusted to a proper value.

When the output usage rate set of quasi-3C100 is decided in this way, although the total color material amount becomes VLim in all quasi-3C100 including 4C100, since the K black expressed by K can produce higher concentration with a smaller color material amount than the process black expressed by CMY in general, gradation is caused in quasi-3C100 even if the total color material amount is VLim, and it is not completely filled with black. By contrast, the output usage rate of K may be adjusted such that quasi-3C100 is not filled with black.

Here, operations of the 4C100 distribution decision processing (step S114) and the quasi-3C100 distribution processing (step S116) correspond to the "first processing operation."

(4) Loop Processing

Processing in subsequent steps S120 to S130 denotes processing in a loop. The loop processing (steps S120 to S130) is performed with respect to index ik of K, and the processing is performed while performing updating like ik=0, 1, 2, . . . and 20.

(5) K Value Decision Processing of Quasi-First Color and Quasi-Second Color

In the first K value decision processing of the quasi-first color and quasi-second color (step S122), the output usage rates of K with respect to the quasi-first color and quasi-second color are decided. In the present embodiment, ik*5 is uniformly substituted into the output usage rates of K with respect to the quasi-first color and quasi-second color (however, in a case where the total color material amount restriction table is defined at intervals of 5%). That is, the output usage rates of K with respect to the quasi-first color and quasi-second color have the same values as the input usage rates of K.

An operation of this K value decision processing with respect to the quasi-first color and quasi-second color (step S122) corresponds to the "second processing operation."

(6) CMY Value Decision Processing of Quasi-First Color

Next, processing that decides the CMY value of the quasi-first color (step S124) is performed. An operation of this CMY value decision processing with respect to the quasi-first color (step S124) corresponds to the "third processing operation."

Since the output usage rate of K is already decided in step S122 for the quasi-first color, the remaining output usage rates of CMY may be decided. Although there are the C axis, the M axis and the Y axis in the quasi-first color, an explanation is given below using the C axis as an example. Because of the C axis, 0 (corresponding to a "minimum domain value") is set to the output usage rates of M and Y. After that, the remaining output usage rate of C may be decided. Since the output usage rate of K has already been decided, the output usage rate of C is decided within the range of the remaining color material amount subtracting the color material amount of K from total color material amount upper limit value VLim.

Figure 7:
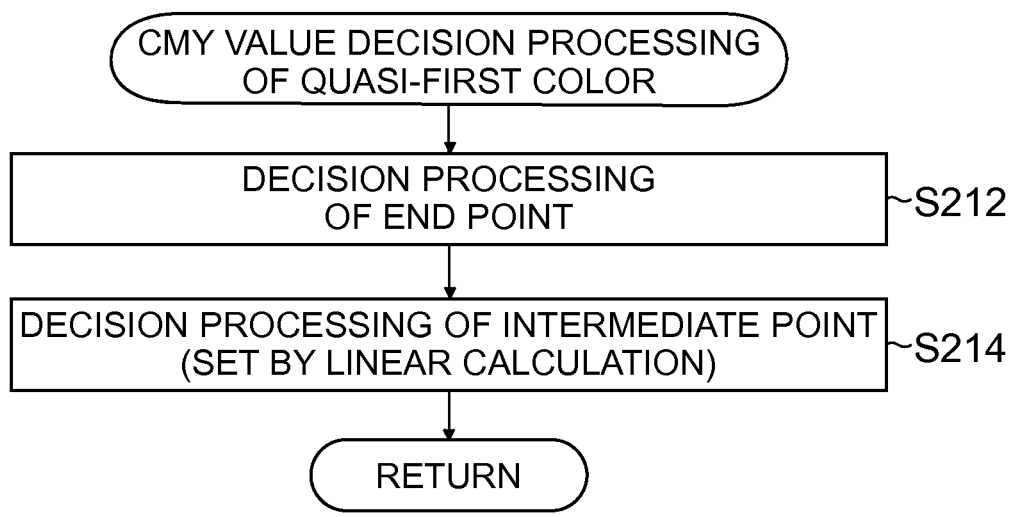
FIG. 7 is a flowchart of CMY value decision processing of a quasi-first color.

To be more specific, it is formed with decision processing of end points in the color solid illustrated in FIG. 5 (step S212 in FIG. 7) and decision processing of intermediate points excluding the end points (step S214 in FIG. 7).

FIG. 7 illustrates a flowchart of the CMY value decision processing of the quasi-first color.

[6-1] Decision Processing of End Point (Example of C Color)

First, the CMY value of the end point is decided (step S212). The end point described herein denotes a color with an input usage rate of (C, M, Y, K)=(100, 0, 0, ik*5). When the output usage rate of C at this time is assumed to be "x," "x" is set by following Equation (6).

[Equation 6]

$$x = \begin{cases} 100 & \text{If } VLim - P2V_k(ik*5) \geq VMax_c \\ V2P_c\left(\dfrac{VLim -}{P2V_k(ik*5)}\right) & \text{Other than this} \end{cases} \quad \text{Equation (6)}$$

The implication of Equation (6) is that, although "100" is basically set, in a case where total color material amount upper limit value VLim is exceeded if "100" is set, the largest value is set within a range of not exceeding it (i.e., within a range equal to or less than total color material amount upper limit value VLim). By this means, it is possible to widen the color reproduction area as much as possible within the range of not exceeding total color material amount upper limit value VLim.

[6-2] Decision Processing of Intermediate Point (Example of C Color)

Next, an intermediate point is decided (step S214). The intermediate point described herein denotes a color when C index is ic=1 to 19. The output usage rate of C is 0 at ic=0. Meanwhile, the output usage rate of C at ic=20 is calculated in Equation (6), and this is assumed as $P_{C100}$. At this time, the output usage rate of C with respect to the intermediate point is set by a linear equation (or linear interpolation) of $P_{C100} \times (ic/20)$. The interpolation operation herein corresponds to the "third interpolation operation."

In the present embodiment, the intermediate point of the quasi-first color is linearly changed in the usage rate space. Although there is a possible method that it is linearly changed in the color material amount space instead of the usage rate space, as described in the term explanation of "usage rate," there is a case where the first color (i.e., the quasi-first color at ik=0) is proofed in advance so as to provide an intended gradation property by a calibration function. Even in the present embodiment, this calibration function is assumed. The calibration function performs adjustment by a plain color (i.e., first color). That is, there is a case where the calibration is performed at K=0 of the quasi-first color. Although the output color is matched by the calibration function, if nonlinear conversion is subsequently applied, the color shift is caused. Therefore, in a case where it is presumed that the first color is proofed by the calibration function so as to provide an intended gradation property, it is desirable to change the first color in a linear fashion.

Meanwhile, when a nonlinear curve is decided every time K is increased in the quasi-first color, the gradation is then changed in a discontinuous manner. Therefore, since the change in the gradation is smoothly linked, it is desirable that the quasi-first color is linearly linked in the usage rate space.

That is, when it is presumed that proofreading is performed so as to provide an intended gradation property when the usage rate is linearly changed, in order to maintain compatibility with such proofreading (i.e., calibration), it is preferable to perform setting such that the quasi-first color on the total color material amount restriction table side is linearly changed in the usage rate space. By doing so, it is possible to keep a natural gradation property even after the total color material amount is restricted.

(7) CMY Value Decision Processing of Quasi-Second Color

Next, CMY decision processing of the quasi-second color (step S126 in FIG. 6) is performed. An operation of this CMY value decision processing of the quasi-second color (step S126) corresponds to the "fourth processing operation." In the CMY decision processing of the quasi-second color, (step S126), the output usage rates of CMY with respect to the quasi-second color are decided. When K is fixed, it is considered that the quasi-second color is roughly divided into a color to express blue (B) by the use of CM, a color to express red (R) by the use of MY and a color to express green (G) by the use of CY.

Here, an explanation is given to only a case where CM is used. In this case, 0 is always set to the output usage rate of Y. Decision processing of quasi-second color CM corresponds to processing that decides the output usage rates in points on lines CB and MB and internal points on plane WCBM in the color solid of FIG. 5. A specific processing method is described below.

Figure 8:
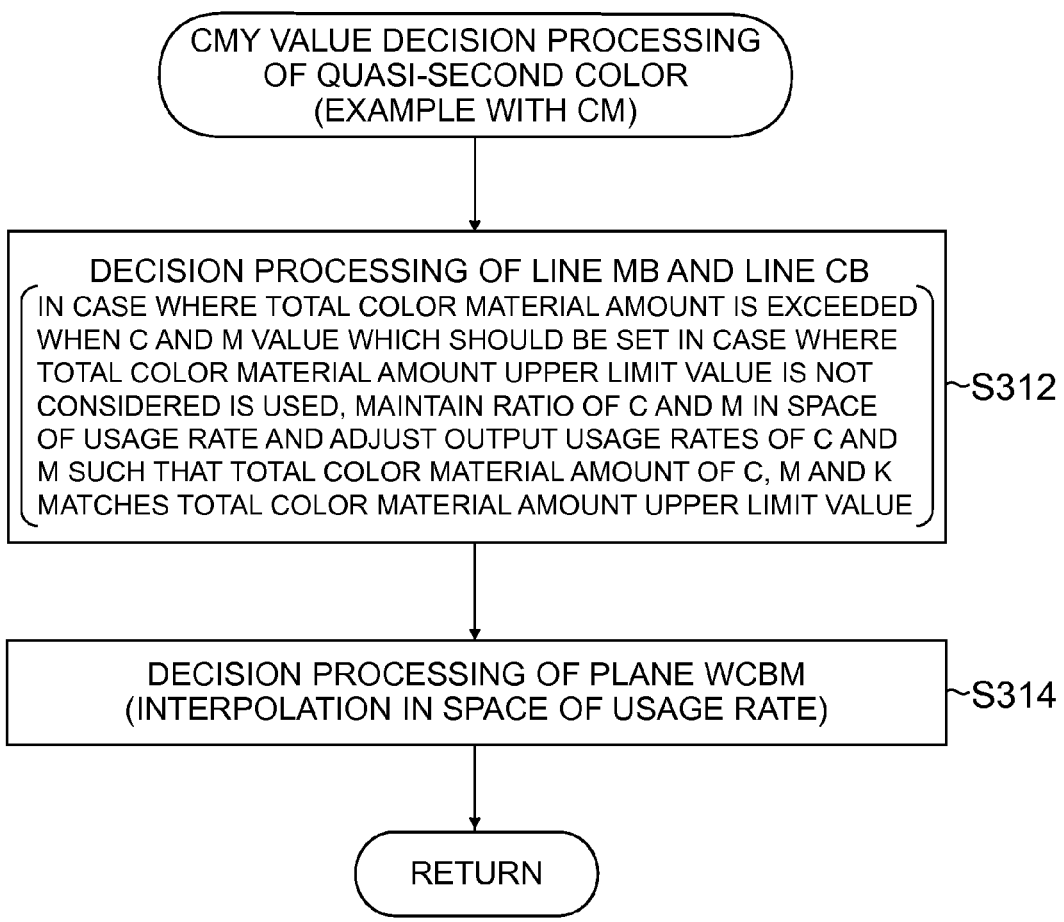
FIG. 8 is a flowchart of CMY value decision processing of a quasi-second color (example with CM)

FIG. 8 illustrates a flowchart of the CMY value decision processing of the quasi-second color (example with CM). The basic idea is similar to the CMY value decision processing of the quasi-first color, and, since the value of K is decided, CMY distribution is defined within a range of the remaining value subtracting the color material amount of K from total color material amount upper limit value VLim.

[7-1] Decision Processing of Lines MB and CB (Example of B Color)

First, decision processing of line MB (step S312 in FIG. 8) is explained. Although the output usage rate of C on the C axis and the output usage rate of M on the M axis are decided in the quasi-first color, when the output usage rate of C on the C axis with respect to each C index is assumed to be $P_{ic}$ and the output usage rate of M on the end point of the M axis is assumed to be $P_{M100}$, if the total color material amount upper limit value is not considered, it is natural to set the output usage rate set on line MB to (C, M, Y, K)=($P_{ic}$, $P_{M100}$, 0, ik*5) is natural. However, since there is a case where the total color material amount upper limit value is exceeded if this goes on, at this time, the output usage rates of C and M are adjusted to match the total color material amount upper limit value.

In this explanation, M corresponds to the "first color material that is one of two kinds of color materials" and C corresponds to the "color material that is not the first color material in the two kinds of color materials." To set the output usage rate of Y to "0" is equivalent to "setting the output signal value with respect to one color other than two kinds of color materials in the CMY value to the minimum value of the domain." Moreover, $P_{M100}$ that is a candidate value of the output usage rate of M corresponds to the "first candidate value" and $P_{ic}$, that is a candidate value of the output usage rate of C corresponds to the "second candidate value."

In a case where the total color material amount of output CMYK values does not exceed the total color material amount upper limit value when the first candidate value and the second candidate value are used, the first candidate value and the second candidate value are adopted as output signal values. In a case where the total color material amount of output CMYK values exceeds the total color material amount upper limit value when the first candidate value and the second candidate value are used, while maintaining the ratio of the first candidate value and the second candidate value, processing that decides the CMY value of the output CMYK signal is performed such that the total color material amount matches the total color material amount upper limit value.

When the adjusted output usage rates of C and M in certain C index is are $x_c$ and $x_m$, $x_c$ and $x_m$ that satisfy following Equations (8) and (9) and cause the left member of Equation 8 to become larger are searched for by nonlinear optimization.

[Equation 7]

$$x_c x_m = P_{ic} \cdot P_{M100} \quad \text{Equation (7)}$$

[Equation 8]

$$P2V_c(x_c) + P2V_m(x_m) \leq VLim - P2V_k(ik*5) \quad \text{Equation (8)}$$

[Equation 9]

$$0 \leq x_c \leq 100, \; 0 \leq x_m \leq 100 \quad \text{Equation (9)}$$

In Equation (7), restriction that keeps the ratio in the usage rate space is introduced. By doing so, an affinity with the gradation of the decided quasi-first color that is linearly changed in the usage rate space becomes high, and it is possible to maintain a natural gradation. In addition, since the left member of Equation (8) is caused to become larger, the maximum used amount can be managed in the color material amount space with a physical meaning, and it is possible to minimize the decrease in the color reproduction area by total color material amount restriction. Here, since one of $x_c$ and $x_m$ is decided if the other is decided by Equation (7), this solves a non-linear optimization problem of one variable.

Regarding line CB, after $P_{ic}$ is read as $P_{C100}$ and $P_{M100}$ is read as $P_{im}$, similar to line MB, it is possible to decide the output usage rates of C and M (step S312).

[7-2] Decision Processing of Plane WCBM (Example of B Color)

Next, an explanation is given to decision processing of plane WCBM (step S314). In FIG. 5, the output usage rate sets of points on lines of quasi-first color C, quasi-first color M, quasi-second color line CB and quasi-second color line MB have been decided above. This follows that the output usage rate sets on the boundary (i.e., boundary point and borderline) of quasi-second color plane WCBM are decided. When this is expressed using total color material amount restriction table L, it clearly shows that all of L[:, 0, 0, ik, :], L[0, :, 0, ik, :], L[−1, :, 0, ik, :] and L[:, −1, 0, ik, :] are decided. Here, colon ":" indicates all indices and color ID's, and shows 0 to 20 in the case of the indices and shows 0 to 3 in the case of the color ID's in the present embodiment. A part with an index of "−1" indicates the maximum index value, and, in the present embodiment, "−1" shows "20."

Next, the output usage rate set of points inside quasi-second color side WCBM is decided. This clearly shows that the value of L[1:−1, 1:−1, 0, ik, :] is decided. Here, "1:−1" has the same meaning as "1:20" in the present embodiment, "1:20" indicates the number equal to or greater than 1 and less than 20, and shows each of indices of 1 to 19. Also, the output usage rate of K has already been set to ik*5 and the output usage rate of Y is set to 0. That is, this is expressed by following Equations (10) and (11).

[Equation 10]

$$L[1{:}{-}1, 1{:}{-}1, 0, ik, 3] = ik*5 \quad \text{Equation (10)}$$

[Equation 11]

$$L[1{:}{-}1, 1{:}{-}1, 0, ik, 2] = 0 \quad \text{Equation (11)}$$

Therefore, the remaining output usage rates of C and M, that is, L[1:−1, 1:−1, 0, ik, 0] and L[1:−1, 1:−1, 0, ik, 1] are decided.

First, the output usage rate of C is decided.

Following Equation (12) is applied to im=1 to 19.

[Equation 12]

$$A = \begin{cases} 1 & \text{If } \begin{array}{l} L[-1, 0, 0, ik, 0] = \\ L[-1, -1, 0, ik, 0] \end{array} \\ \dfrac{L[-1, im, 0, ik, 0] - L[-1, 0, 0, ik, 0]}{L[-1, -1, 0, ik, 0] - L[-1, 0, 0, ik, 0]} & \text{Other than this} \end{cases} \quad \text{Equation (12)}$$

The output usage rate of C is defined by Equation (13) using weight A defined above.

[Equation 13]

$$L[:, im, 0, ik, 0] = A*L[:, -1, 0, ik, 0] + (1-A)*L[:, 0, 0, ik, 0] \quad \text{Equation (13)}$$

Next, the output usage rate of M is decided. Following Equation (14) is applied to ic=1 to 19.

[Equation 14]

$$B = \begin{cases} 1 & \text{If } \begin{array}{l} L[0, -1, 0, ik, 1] = \\ L[-1, -1, 0, ik, 1] \end{array} \\ \dfrac{L[ic, -1, ik, 0, 1] - L[0, -1, 0, ik, 1]}{L[-1, -1, 0, ik, 1] - L[0, -1, 0, ik, 1]} & \text{Other than this} \end{cases} \quad \text{Equation (14)}$$

The output usage rate of M is defined by Equation (15) using weight B defined above.

[Equation 15]

$$L[ic, :, 0, ik, 1] = B*L[-1, :, 0, ik, 1] + (1-B)*L[0, :, 0, ik, 1] \quad \text{Equation (15)}$$

Equations (13) and (15) show that linear interpolation is performed in the usage rate space. Here, this interpolation operation corresponds to the "fourth interpolation operation."

Since the output usage rate sets of points on the lines of quasi-first color C, quasi-first color M, quasi-second color line CB and quasi-second color line MB are created in advance so as to keep the ratio in the usage rate space, even if the inside is linearly interpolated in the usage rate space, the gradation is smoothly linked.

(8) CMYK Value Decision Processing of Quasi-Third Color

Figure 9:
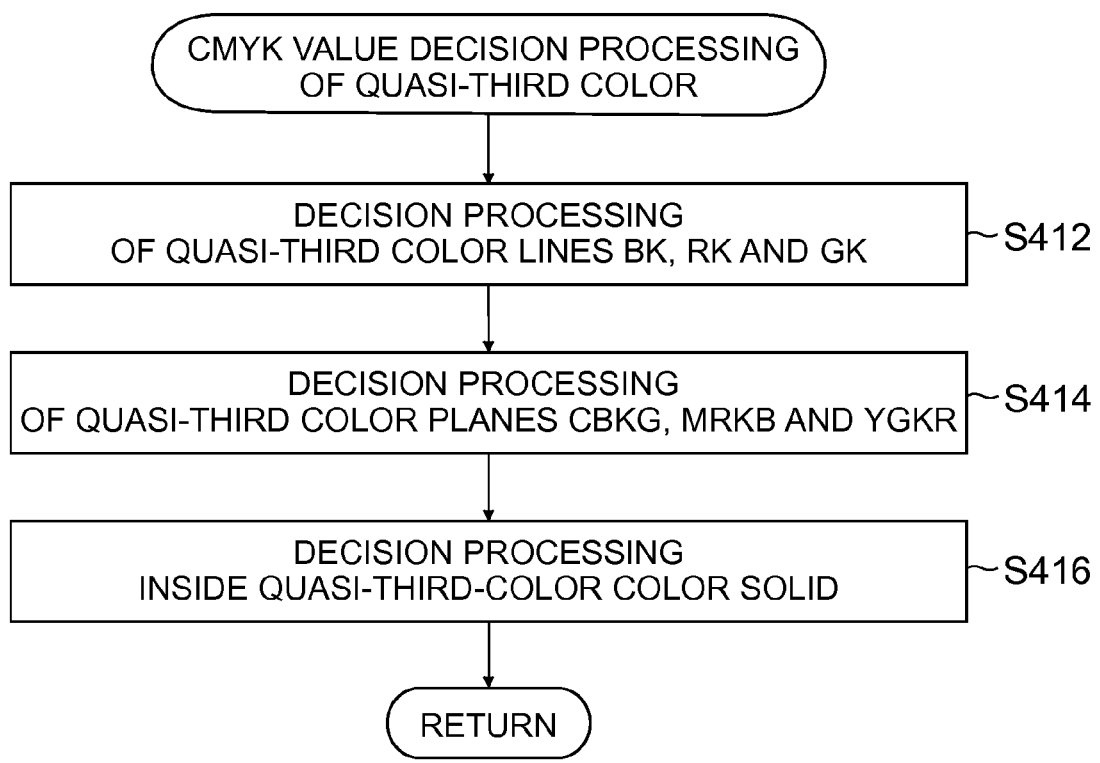
FIG. 9 is a flowchart of CMYK value decision processing of a quasi-third color.

Next, CMYK value decision processing of the quasi-third color (step S128 in FIG. 6) is performed. An operation of this CMYK value decision processing of the quasi-third color (step S128) corresponds to the "fifth processing operation." FIG. 9 illustrates a flowchart of the CMYK value decision processing of the quasi-third color.

The output usage rate sets up to the quasi-second color have decided in the above explanation (steps S122 to S126 in FIG. 6). In step S128 in FIG. 6, finally, the output usage rate set of the quasi-third color is decided. It is noted that the output usage rate set L[−1, −1, −1, ik, :] of quasi-3C100 has been already decided (step S116).

In the CMYK decision processing of the quasi-third color (step S128 in FIG. 6 and FIG. 9), processing that decides the output usage rates of the BK axis (line BK), RK axis (line RK)

and GK axis (line GK) in FIG. 5 is performed first (step S412 in FIG. 9), processing that decides the output usage rates of planes CBKG, MRKB and YGKR is performed next (step S414), and, after that, processing that decides the output usage rate with respect to the index inside the color solid of the quasi-third color is performed (step S416). In the following, each of processing contents is described.

[8-1] Regarding Decision Processing of Quasi-Third Color Lines BK, RK and GK

First, processing that decides the output usage rates of the BK axis, RK axis and GK axis in FIG. 5 (step S412 in FIG. 9) is described. Although an explanation is given below using the BK axis as an example, the same applies to the RK axis and the GK axis.

Vertex K in FIG. 5 uses color materials up to the value matching the total color material amount upper limit value, and vertex B is already decided to use color materials as much as possible. The output usage rate set of vertex K is stored in $L[-1, -1, -1, ik, :]$ and the output usage rate set of vertex B is stored in $L[-1, -1, 0, ik, :]$.

The simplest method of deciding output usage rate set $L[-1, -1, 1:-1, ik, :]$ of line BK is a method of performing linear interpolation on each of C, M, Y, and K. When this is expressed by an equation, following Equation (16) is set to iy=1 to 19.

[Equation 16]

$$L[-1,-1,iy,ik,0]=\{(20-iy)/20\}*L[-1,-1,0,ik,0]+(iy/20)*L[-1,-1,-1,ik,0]$$

$$L[-1,-1,iy,ik,1]=\{(20-iy)/20\}*L[-1,-1,0,ik,1]+(iy/20)*L[-1,-1,-1,ik,1]$$

$$L[-1,-1,iy,ik,2]=\{(20-iy)/20\}*L[-1,-1,0,ik,2]+(iy/20)*L[-1,-1,-1,ik,2]$$

$$L[-1,-1,iy,ik,3]=\{(20-iy)/20\}*L[-1,-1,0,ik,3]+(iy/20)*L[-1,-1,-1,ik,3] \quad \text{Equation (16)}$$

However, when linear interpolation is performed in the usage rate space like Equation (16), there is a case where the total color material amount in an interpolation point exceeds or falls below the total color material amount upper limit value. This is caused by the existence of a non-linear relationship between the usage rate and the color material amount.

In a case where it exceeds the total color material amount upper limit value, the original function of the total color material amount restriction table cannot be fulfilled, and, meanwhile, in a case where it falls below the total color material amount upper limit value, it is not possible to sufficiently fulfill a potential color reproduction area of a print system.

As one method of solving the above-mentioned problem, there is a possible method of performing linear interpolation in the color material amount space. By performing linear interpolation in the color material amount space, it does not excessively exceed or fall below the color material amount upper limit value. However, since the output usage rates up to the quasi-second color are designed to keep the ratio in the usage rate space, when only the quasi-third color is linearly interpolated in the color material amount space, there occurs another problem that the gradation is not smoothly linked.

Therefore, in the present embodiment, the following method is used to solve those problems.

Figure 10:
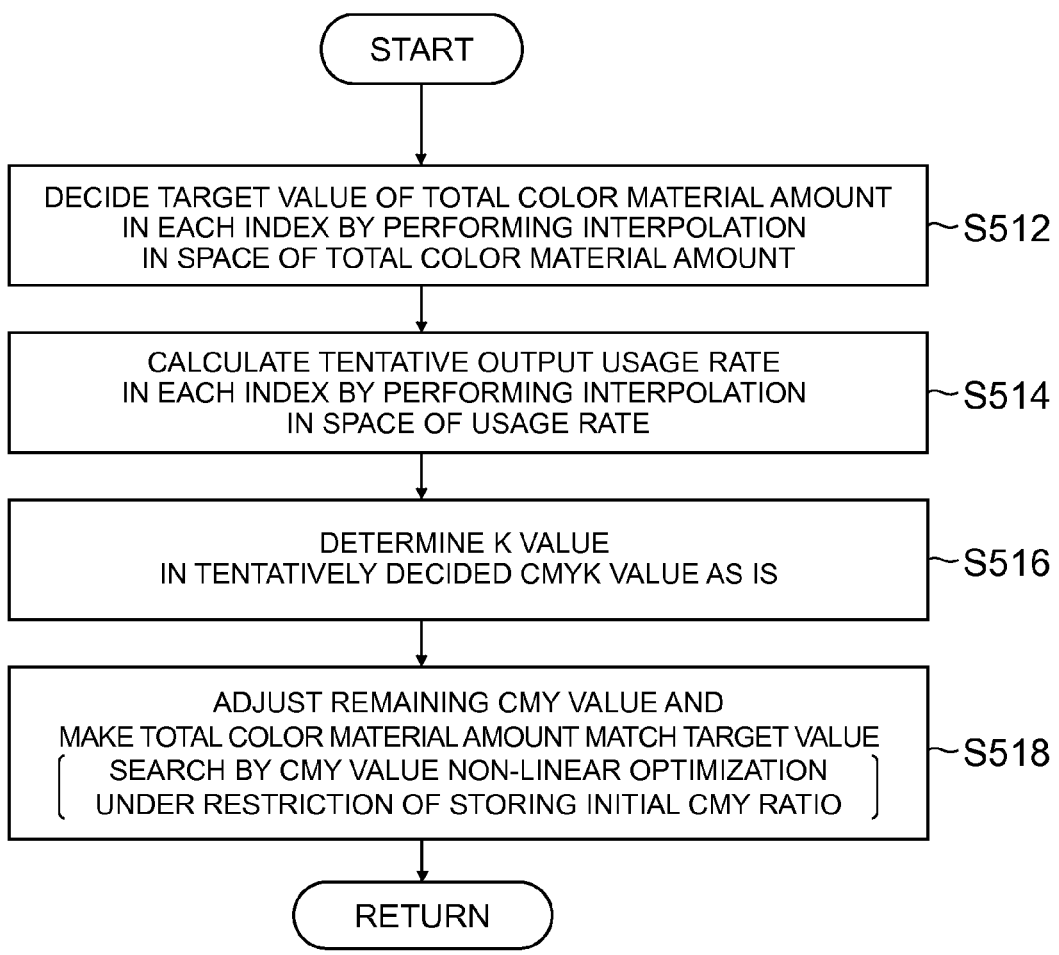
FIG. 10 is a flowchart indicating processing procedure according to the present embodiment.

FIG. 10 illustrates a flowchart of processing procedure according to the present embodiment. First, by newly defining the space of the total color material amount and performing interpolation (corresponding to "first interpolation operation") in the space of the total color material amount, the target value of the total color material amount in each index is decided in advance (step S512 in FIG. 10, "operation that sets the target value"). When this is explained with an equation, it is expressed as follows. First, when the total color material amounts on both end points of the BK axis are assumed to be $V[-1, -1, 0, ik]$ and $V[-1, -1, -1, ik]$, these can be calculated by following Equations (17) and (18).

[Equation 17]

$$V[-1,-1,0,ik]=P2V_c(L[-1,-1,0,ik,0])+P2V_m(L[-1,-1,0,ik,1])+P2V_y(L[-1,-1,0,ik,2])+P2V_k(L[-1,-1,0,ik,3]) \quad \text{Equation (17)}$$

[Equation 18]

$$V[-1,-1,-1,ik]=P2V_c(L[-1,-1,-1,ik,0])+P2V_m(L[-1,-1,-1,ik,1])+P2V_y(L[-1,-1,-1,ik,2])+P2V_k(L[-1,-1,-1,ik,3]) \quad \text{Equation (18)}$$

Here, following Equation (19) is applied to iy=1 to 19.

[Equation 19]

$$V[-1,-1,iy,ik]=\{(20-iy)/20\}*V[-1,-1,0,ik,:]+(iy/20)*V[-1,-1,-1,ik]) \quad \text{Equation (19)}$$

It is possible to perform linear interpolation in the space of the total color material amount by the above calculation, and $V[-1, -1, iy, ik]$ becomes the target value of the total color material amount in index $[-1, -1, iy, ik]$. Also, the interpolation processing herein corresponds to the "first interpolation processing."

Next, output usage rates C M, Y, and K (corresponding to "tentative output CMYK signal") in each index which is tentatively decided by performing interpolation in the usage rate space are prepared (step S514 in FIG. 10, "operation that calculates a tentative output CMYK signal"). This can be calculated by the right member of Equation (16). This interpolation operation corresponds to the "second interpolation operation" and the interpolation processing corresponds to the "second interpolation processing."

Next, with respect to the CMYK value that is tentatively decided, the K value is fixed to this value (step S516 in FIG. 10, "operation that fixes it as the K value") and the remaining CMY are adjusted such that the total color material amount matches target value $V[-1, -1, iy, ik]$ (step S518 in FIG. 10, "operation that decides the CMY value so as to match the target value"). At this time, search is performed by CMY value non-linear optimization under restriction of storing the initial CMY ratio of C:M:Y. When two of C, M, and Y are decided, the remaining one is automatically decided, non-linear optimization of two variables are performed here. By doing so, it is possible to avoid that the total color material amount exceeds or falls below the total color material amount upper limit value in excess, it is possible to sufficiently fulfill the color reproduction area of the print system, the ratio in the usage rate space is maintained, and therefore the gradation can be smoothly linked.

[8-2] Decision Processing of Quasi-Third Color Planes CBKG, MRKB and YGKR

Next, processing that decides the output usage rates of planes CBKG, MRKB and YGKR in FIG. 5 is performed (step S414 in FIG. 9). Here, although an explanation is given using plane CBKG as an example, the same applies to planes MRKB and YGKR. Since lines CB, CG, BK, and GK have been decided as above, it only has to perform an interpolation operation by the use of these items of information. However, when linear interpolation is simply performed in the usage rate space or linear interpolation is simply performed in the color material amount space, since the gradation is not smoothly linked, a similar method to above-described section [8-1] is adopted here.

That is, although the output usage rate set of plane CBKG is set to L[−1, :, :, ik, :], since the surrounding boundary (lines CB, CG, BK and GK) of plane CBKG have been already set, it only has to decide L[−1, im, iy, ik, :] with respect to each of im=1 to 19 and iy=1 to 19.

First, the target value of the total color material amount with respect to index [−1, im, iy, ik] is calculated (see step S512 in FIG. 10). When this is assumed to be V[−1, im, iy, ik], it is decided by an idea of linear interpolation as shown in following Equation (20).

[Equation 20]

$$V[-1,im,iy,ik]=(v_1+v_2)/2$$

$$v_1=\{(20-iy)/20\}*V[-1,im,0,ik]+(iy/20)*V[-1,im,-1,ik]$$

$$v_2=\{(20-im)/20\}*V[-1,0,iy,ik]+(im/20)*V[-1,-1,iy,ik] \quad \text{Equation (20)}$$

This interpolation calculation corresponds to the "first interpolation calculation" and the interpolation processing corresponds to the "first interpolation processing."

Next, tentative output usage rate set L'[−1, im, iy, ik, :] with respect to index [−1, im, iy, ik], it is decided by the idea of linear interpolation as shown in following Equation (21) (see step S514 in FIG. 10).

[Equation 21]

$$L'[-1,im,iy,ik,0]=(c_1+c_2)/2$$

$$c_1=\{(20-iy)/20\}*L[-1,im,0,ik,0]+(iy/20)*L[-1,im,-1,ik,0]$$

$$c_2=\{(20-im)/20\}*L[-1,0,iy,ik,0]+(im/20)*L[-1,-1,iy,ik,0]$$

$$L'[-1,im,iy,ik,1]=(m_1+m_2)/2$$

$$m_1=\{(20-iy)/20\}*L[-1,im,0,ik,1]+(iy/20)*L[-1,im,-1,ik,1]$$

$$m_2=\{(20-im)/20\}*L[-1,0,iy,ik,1]+(im/20)*L[-1,-1,iy,ik,1]$$

$$L'[-1,im,iy,ik,2]=(y_1+y_2)/2$$

$$y_1=\{(20-iy)/20\}*L[-1,im,0,ik,2]+(iy/20)*L[-1,im,-1,ik,2]$$

$$y_2=\{(20-im)/20\}*L[-1,0,iy,ik,2]+(im/20)*L[-1,-1,iy,ik,2]$$

$$L'[-1,im,iy,ik,3]=(k_1+k_2)/2$$

$$k_1=\{(20-iy)/20\}*L[-1,im,0,ik,3]+(iy/20)*L[-1,im,-1,ik,3]$$

$$k_2=\{(20-im)/20\}*L[-1,0,iy,ik,3]+(im/20)*L[-1,-1,iy,ik,3] \quad \text{Equation (21)}$$

This interpolation calculation corresponds to the "second interpolation calculation" and the interpolation processing corresponds to the "second interpolation processing."

Next, with respect to the CMYK value that is tentatively decided, the K value is fixed to this value (see step S516 in FIG. 10) and the remaining CMY are adjusted such that the total color material amount matches target value V[−1, im, iy, ik] (see step S518 in FIG. 10). At this time, search is performed by CMY value non-linear optimization under restriction of storing the initial CMY ratio of C:M:Y. When two of C, M, and Y are decided, the remaining one is automatically decided, non-linear optimization of two variables are performed here. By doing so, it is possible to avoid that the total color material amount exceeds or falls below the total color material amount upper limit value in excess, it is possible to sufficiently fulfill the color reproduction area of the print system, the ratio in the usage rate space is maintained, and therefore the gradation can be smoothly linked.

[8-3] Regarding Difference in Color Distribution on L*a*b Space Because of Difference in Interpolation Processing Above-mentioned sections [8-1] and [8-2] refer to (1) interpolation on the usage rate space, (2) interpolation on the color material amount space and (3) processing combining the interpolation on the color material amount space and the interpolation on the usage rate space, and an explanation has been given where the present embodiment adopts (3) "processing that decides an output CMYK value using the interpolation result on the color material amount space and the interpolation result on the usage rate space." Here, how the color of each index in the L*a*b* space is distributed by each of interpolation processing (1) to interpolation processing (3) is compared and considered.

Figure 11:
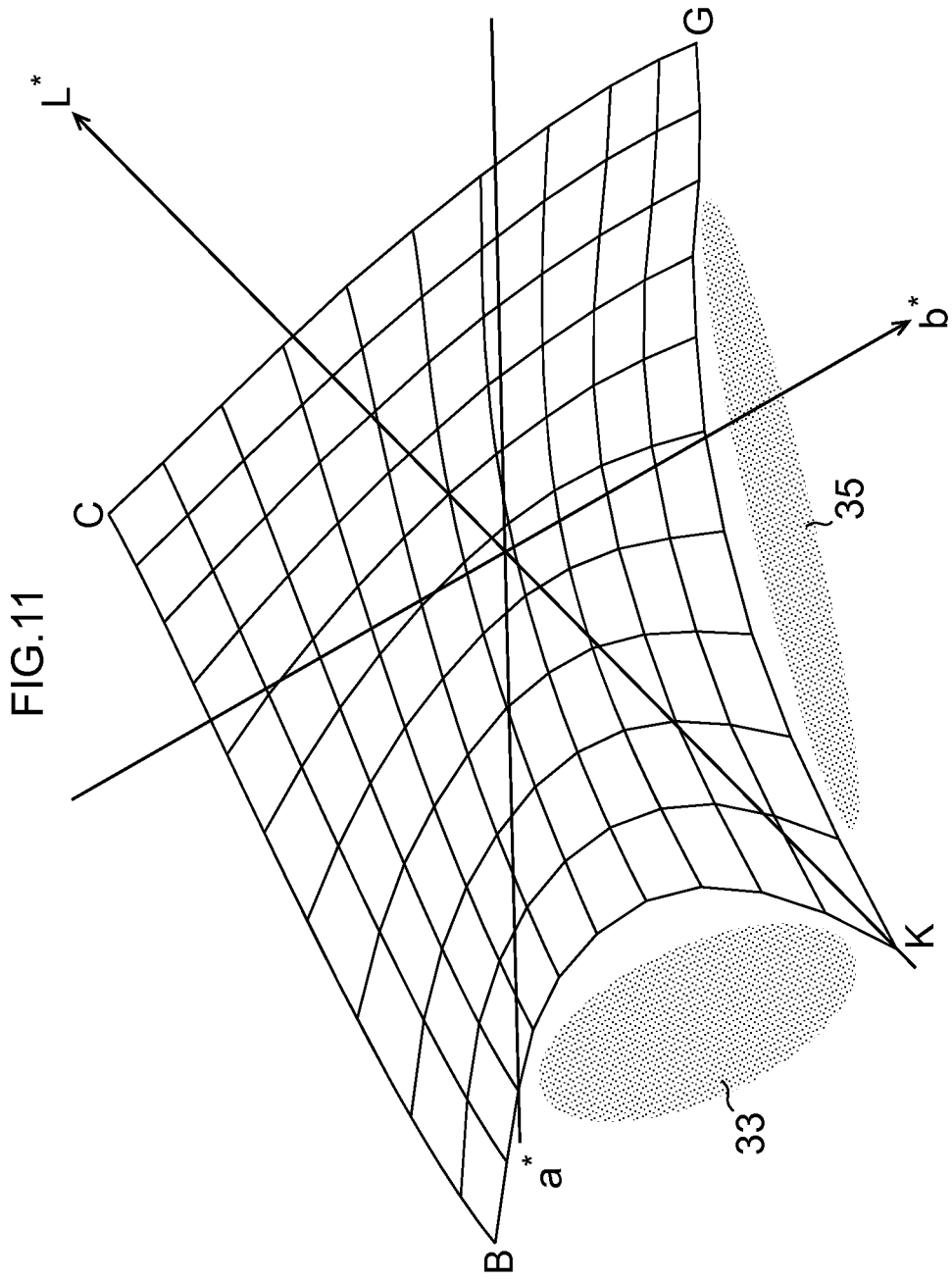
FIG. 11 is a diagram indicating a measurement result in the L*a*b* color space at the time of print output by the use of an output usage rate set in a case where linear interpolation is performed in the usage rate space (reference example 1)
Figure 12:
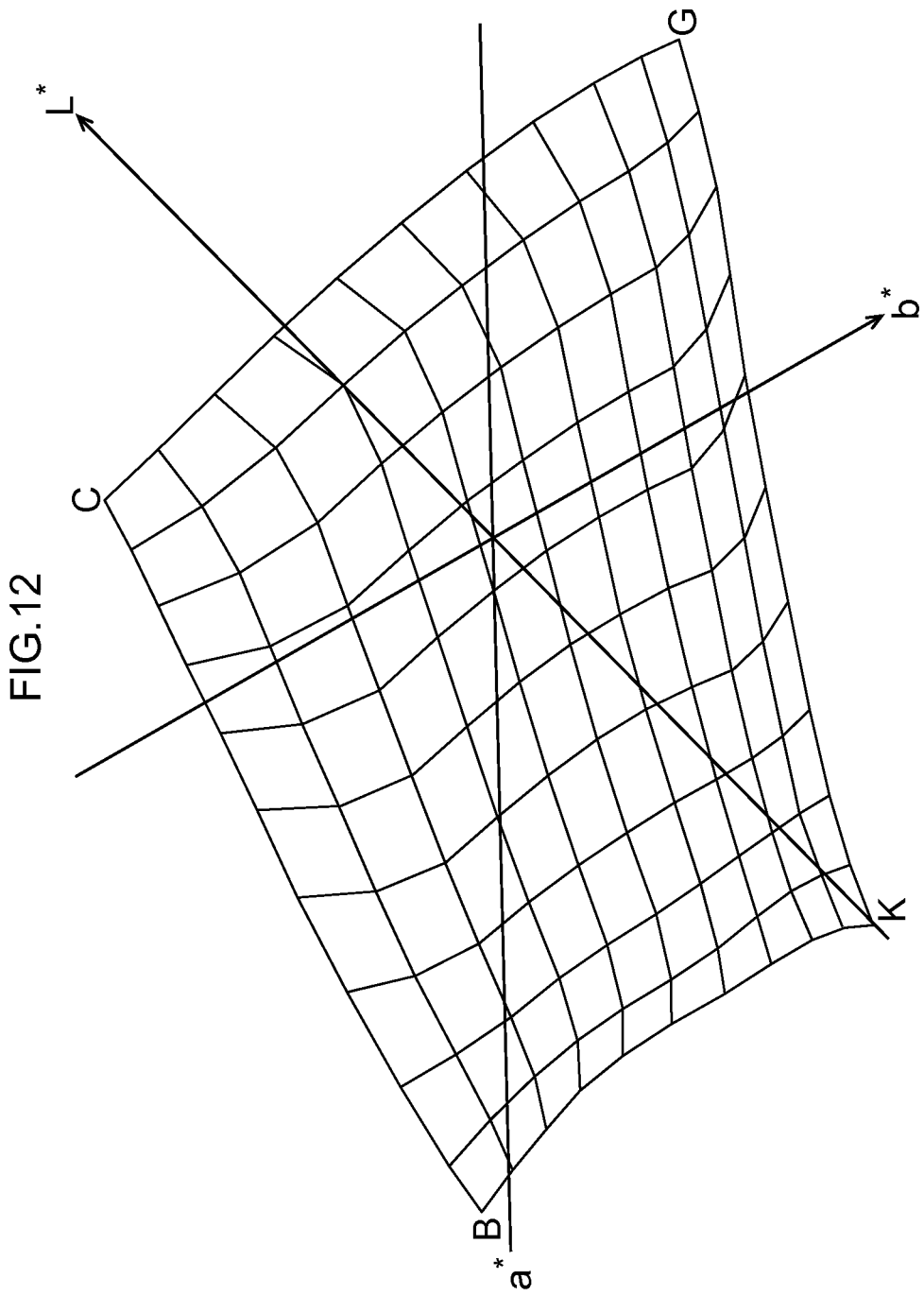
FIG. 12 is a diagram indicating a measurement result in the L*a*b* color space at the time of print output by the use of an output usage rate set in a case where linear interpolation is performed in the color material space (reference example 2)
Figure 13:
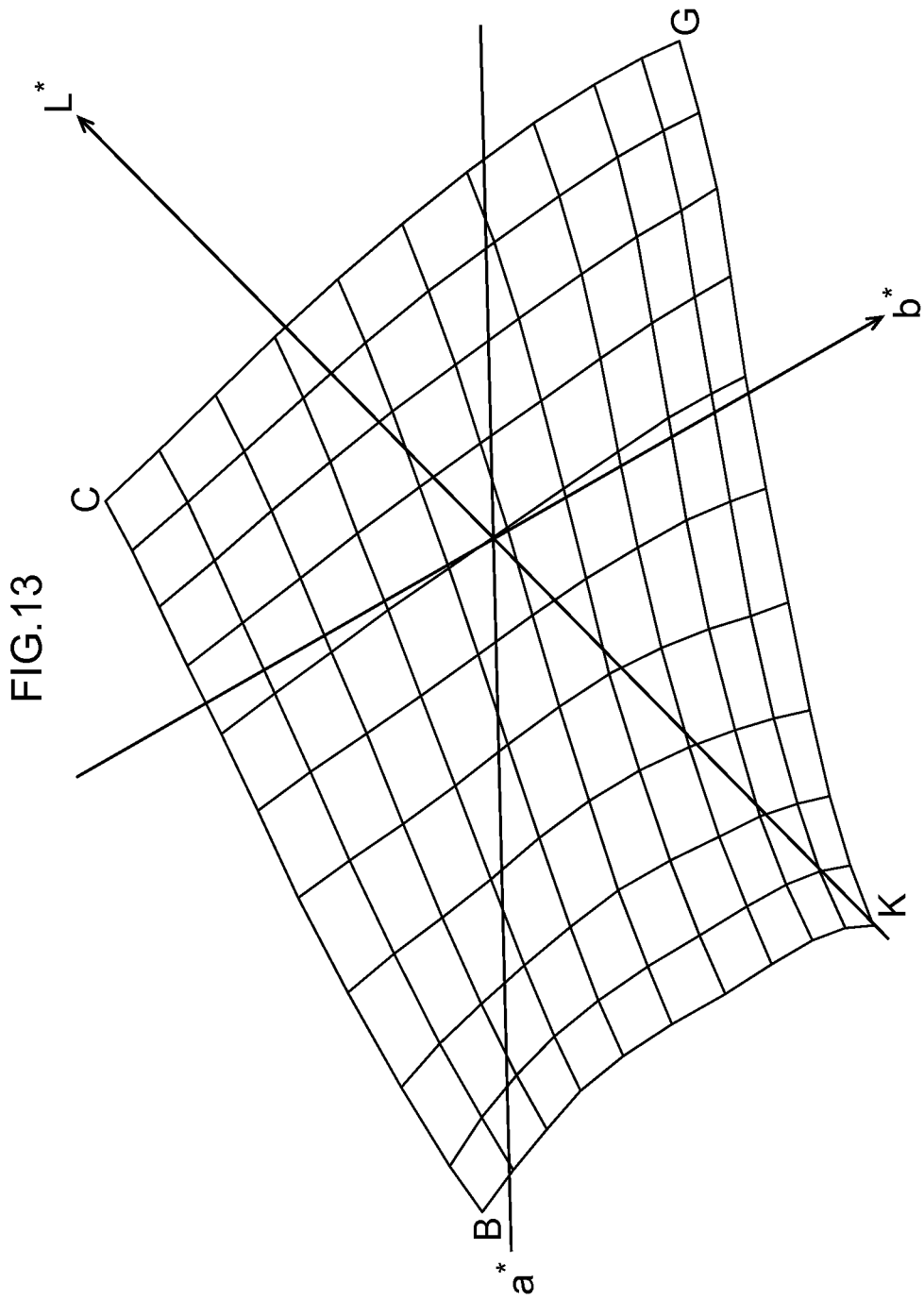
FIG. 13 is a diagram indicating a measurement result in the L*a*b* color space at the time of print output by the use of an output usage rate set (of the present embodiment) in a case where a CMYK value is decided using the interpolation result in the total color material amount and the interpolation result in the usage rate space.

As one explanation example, plane CBKG in the quasi-third color is provided as an example. FIGS. 11, 12 and 13 illustrate a plot example in a case where the output usage rate set is decided by each of interpolation processing (1), (2) and (3), printing is performed in the print system using the output usage rate set and the color is measured in the L*a*b* color space.

That is, FIG. 11 is a diagram in a case where linear interpolation is performed in the usage rate space (reference example 1), FIG. 12 is a diagram in a case where linear interpolation is performed in the color material amount space (reference example 2), and FIG. 13 is a diagram in a case where an output CMYK value is decided using the linear interpolation result in the total color material amount space and the interpolation result in the usage rate space (the present embodiment). In these figures, the coordinate axis of Lab is inclined and drawn in the direction in which target plane CBKG can be seen most easily.

In FIG. 11, since linear interpolates is performed in the usage rate space, the trajectory of the colors of lines BK and GK is greatly curved internally. This is an example in which the total color material amount greatly falls below the total color material amount upper limit value and the color reproducibility that is potentially held in the print system cannot be sufficiently fulfilled.

That is, the color reproduction area in the parts indicated by reference numerals 33 and 35 in FIG. 11 cannot be used.

In FIG. 12, since linear interpolation is performed in the color material amount space, although the trajectory of the colors of lines BK and GK can sufficiently fulfill the color reproducibility which is potentially held in the print system unlike FIG. 11, there arises a problem that the gradation is not smoothly linked in the trajectory of colors inside plane CBKG.

By contrast with this, in FIG. 13 realized by the present embodiment, it is possible to not only sufficiently fulfill the color reproducibility which is potentially held in the print system but also link the internal gradation smoothly.

[8-4] Decision Processing Inside Quasi-Third-Color Color Solid

Processing that decides the output usage rate set with respect to an index inside the quasi-third-color color solid is performed (step S416 in FIG. 9). Since the output usage rate sets in all planes (6 planes) of the color solid shown in FIG. 5 have been decided as above, it only has to interpolate the inside of the color solid by the use of these items of information. Here, the idea similar to sections [8-1] and [8-2] is used.

Although the output usage rate set inside the quasi-third-color color solid is set to L[:, :, :, ik, :], since 6 planes of the color solid (quasi-second color planes WCBM, WCGY and WMRY and quasi-third-color planes CGKB, YRKB and MRKB) have been set, it only has to decide L[ic, im, iy, ik, :] with respect to each of ic=1 to 19, im=1 to 19 and iy=1 to 19.

First, the target value of the total color material amount with respect to index [ic, im, iy, ik] is calculated (Step S512 in FIG. 10 is seen). When this is assumed to be V[ic, im, iy, ik], it is decided by an idea of linear interpolation as shown in following Equation (22).

[Equation 22]

$$V[ic,im,iy,ik]=(v_1+v_2+v_3)/3$$

$$v_1=\{(20-ic)/20\}*V[0,im,iy,ik]+(iy/20)*V[-1,im,iy,ik]$$

$$v_2=\{(20-im)/20\}*V[ic,0,iy,ik]+(im/20)*V[ic,-1,iy,ik]$$

$$v_3=\{(20-iy)/20\}*V[ic,im,0,ik]+(iy/20)*V[ic,im,-1,ik] \quad \text{Equation (22)}$$

This interpolation calculation corresponds to the "first interpolation calculation" and the interpolation processing corresponds to the "first interpolation processing."

Next, tentative output usage rate set L'[ic, im, iy, ik, :] with respect to index [ic, im, iy, ik, :] is decided by the idea of linear interpolation as shown in following Equation (23) (see step S514 in FIG. 10).

[Equation 23]

$$L'[ic,im,iy,ik,0]=(c_1+c_2+c_3)/2$$

$$c_1=\{(20-ic)/20\}*L[0,im,iy,ik,0]+(ic/20)*L[-1,im,iy,ik,0]$$

$$c_2=\{(20-im)/20\}*L[ic,0,iy,ik,0]+(im/20)*L[ic,-1,iy,ik,0]$$

$$c_3=\{(20-iy)/20\}*L[ic,im,0,ik,0]+(iy/20)*L[ic,im,-1,ik,0]$$

$$L'[ic,im,iy,ik,1]=(m_1+m_2+m_3)/2$$

$$m_1=\{(20-ic)/20\}*L[0,im,iy,ik,1]+(ic/20)*L[-1,im,iy,ik,1]$$

$$m_2=\{(20-im)/20\}*L[ic,0,iy,ik,1]+(im/20)*L[ic,-1,iy,ik,1]$$

$$m_3=\{(20-iy)/20\}*L[ic,im,0,ik,1]+(iy/20)*L[ic,im,-1,ik,1]$$

$$L'[ic,im,iy,ik,2]=(y_1+y_2+y_3)/2$$

$$y_1=\{(20-ic)/20\}*L[0,im,iy,ik,2]+(ic/20)*L[-1,im,iy,ik,2]$$

$$y_2=\{(20-im)/20\}*L[ic,0,iy,ik,2]+(im/20)*L[ic,-1,iy,ik,2]$$

$$y_3=\{(20-iy)/20\}*L[ic,im,0,ik,2]+(iy/20)*L[ic,im,-1,ik,2]$$

$$L'[ic,im,iy,ik,3]=(k_1+k_2+k_3)/2$$

$$k_1=\{(20-ic)/20\}*L[0,im,iy,ik,3]+(ic/20)*L[-1,im,iy,ik,3]$$

$$k_2=\{(20-im)/20\}*L[ic,0,iy,ik,3]+(im/20)*L[ic,-1,iy,ik,3]$$

$$k_3=\{(20-iy)/20\}*L[ic,im,0,ik,3]+(iy/20)*L[ic,im,-1,ik,3] \quad \text{Equation (23)}$$

This interpolation calculation corresponds to the "second interpolation calculation" and the interpolation processing corresponds to the "second interpolation processing."

Next, with respect to the CMYK value that is tentatively decided, the K value is fixed to this value (see step S516 in FIG. 10) and the remaining CMY are adjusted such that the total color material amount matches target value V[ic, im, iy, ik] (see step S518 in FIG. 10). At this time, search is performed by CMY value non-linear optimization under restriction of storing the initial CMY ratio of C:M:Y. When two of C, M, and Y are decided, the remaining one is automatically decided, non-linear optimization of two variables are performed here. By doing so, it is possible to avoid that the total color material amount exceeds or falls below the total color material amount upper limit value in excess, it is possible to sufficiently fulfill the color reproduction area of the print system, the ratio in the usage rate space is maintained, and therefore the gradation can be smoothly linked.

ADVANTAGE OF EMBODIMENT (1) According to the present embodiment, since the total color material amount is restricted in the space of "color material amount" (i.e., the second scale) with a physical meaning indicating the color material amount in substance, even if there is a non-linear relationship between the signal value and the color material amount, it is possible to appropriately restrict the total color material amount.

(2) Therefore, it is possible to minimize the decrease in the color reproduction area by the total color material amount restriction and sufficiently fulfill the color reproducibility which is potentially held in the print system (i.e., image formation apparatus).

(3) Moreover, according to the present embodiment, regarding interpolation processing used to decide an output CMYK value in a point inside the color solid internal (i.e., inside the borderline), the output CMYK value is decided using the interpolation processing result in the space of the total color material amount with a physical meaning and the interpolation processing result in the space of the usage rate. By adopting such processing, it is possible to adequately restrict the total color material amount, keep the order of the ratio in the usage rate space and link the gradation smoothly.

<Regarding Program to Create Total Color Material Amount Restriction Table>

The above-mentioned creation processing function of the total color material amount restriction table according to the embodiment can be realized by a computer. That is, it is possible to provide a program to cause the computer to execute each operation of the total color material amount restriction table creation method described in FIGS. 1 to 10.

Moreover, it is possible to provide it by an information recording medium that is a computer-readable tangible (non-transitory) entity recording the program. Examples of the information recording medium include various formats such as a magnetic disk, memory card, optical disc, hard disk drive (HDD) and flash memory drive (SSD; Solid State Drive). Moreover, it is also possible to provide the program as data (or signal) of the program through a telecommunication line such as the Internet.

In the embodiment of the present invention described above, it is possible to adequately change, add or delete components without departing from the scope of the invention. The present invention is not limited to the embodiment described above, and many changes can be made by the person who has usual knowledge in the field within the technical idea of the present invention.

What is claimed is:

1. A creation method of a total color material amount restriction table that defines a conversion relationship to convert an input CMYK signal prior to total color material amount restriction to an output CMYK signal subjected to total color material amount restriction, in order to restrict a total color material amount provided to a recording medium in an image formation apparatus that forms an image on the recording medium using color materials of cyanogen (C), magenta (M), yellow (Y) and black (K), the method comprising:

a step of acquiring a first converter that calculates a value of a color material amount represented by a second scale with a physical meaning indicating an amount of a color material provided to the recording medium by the image formation apparatus, from a signal value from the signal value represented by a first scale that defines a used amount of each of the color materials of C, M, Y, and K;

a step of acquiring a second converter that calculates a signal value represented by the first scale from the value of the color material represented by the second scale;

a step of setting a total color material amount upper limit value represented by the second scale; and a table creation processing step of creating the total color material amount restriction table that defines an output CMYK signal with a total color material amount equal to or less than the total color material amount upper limit value with respect to an input CMYK signal, using the first converter, the second converter and the total color material amount upper limit value, wherein:

the table creation processing step includes:

a first processing step of deciding an output CMYK signal corresponding to an input CMYK signal when each of signal values of C, M, and Y in the input CMYK signal is a maximum value in a domain of the signal value defined by the first scale;

a second processing step of deciding a K value of an output CMYK signal corresponding to an input CMYK signal using one or two kinds of color materials among C, M, and Y;

a third processing step of deciding a CMY value of an output CMYK signal corresponding to an input CMYK signal using one kind of color material among C, M, and Y;

a fourth processing step of deciding a CMY value of an output CMYK signal corresponding to an input CMYK signal using two kinds of color materials among C, M, and Y;

a fifth processing step of deciding a CMYK value of an output CMYK signal corresponding to an input CMYK signal using three kinds of color materials among C, M, and Y; and the fifth processing step includes processing that defines an output CMYK signal with a total color material amount equal to or less than the total color material amount upper limit value, using a total color material amount value calculated by first interpolation processing that performs a first interpolation calculation in a space of a total color material amount by the second scale and a CMYK value calculated by second interpolation processing that performs a second interpolation calculation in a space of the first scale.

2. The creation method of the total color material amount restriction table according to claim 1, wherein the first processing step includes processing that decides an output CMYK signal in which a total color material amount by the output CMYK signal is the total color material amount upper limit value while maintaining a CMY ratio of the input CMYK signal.

3. The creation method of the total color material amount restriction table according to claim 1, wherein the fifth processing step includes:

a step of setting a target value of a total color material amount corresponding to an input CMYK signal by the first interpolation processing performed in a space of the total color material amount by the second scale;

a step of calculating a tentative output CMYK signal corresponding to an input CMYK signal by the second interpolation processing performed in the space of the first scale;

a step of determining a K value in the tentative output CMYK signal as the K value of the CMYK signal; and a step of deciding a CMY value such that a total color material amount matches the target value by adjusting a remaining CMY value in the tentative output CMYK signal.

4. The creation method of the total color material amount restriction table according to claim 1, wherein the first processing step includes processing that defines a K value of an output CMYK signal when all signal values of C, M, Y and K in an input CMYK signal are the maximum value in the domain by the first scale, as the maximum value, and adjusts a remaining CMY value to decide an output CMYK signal such that a total color material amount by the output CMYK signal matches the total color material amount upper limit value.

5. The creation method of the total color material amount restriction table according to claim 1, wherein the first processing step includes processing that sets a K value of an output CMYK signal such that a K value of a corresponding output CMYK signal increases as a K value of an input CMYK signal increases.

6. The creation method of the total color material amount restriction table according to claim 1, wherein the second processing step includes processing that decides a value equivalent to a K value of an input CMYK signal as a K value of an output CMYK signal.

7. The creation method of the total color material amount restriction table according to claim 1, wherein:

the third processing step includes processing that decides an output CMYK signal when a signal value of the one kind of color material in the input CMYK signal is the maximum value of the domain by the first scale; and a minimum value of the domain is set to each signal value with respect to two colors other than the one kind of color material in the CMY value among the output CMYK signal, and a maximum value is set to the signal value of the one kind of color material within a range in which a total color material amount falls below the total color material amount upper limit value.

8. The creation method of the total color material amount restriction table according to claim 1, wherein the third processing step includes processing that defines a CMY value of an output CMYK signal by performing a third interpolation calculation in the space of the first scale.

9. The creation method of the total color material amount restriction table according to claim 1, wherein:

the fourth processing step includes processing that decides an output CMYK signal when a signal value of a first color material that is one of the two kinds of color materials in the input CMYK signal is the maximum value of the domain by the first scale;

a minimum value of the domain is set to an output signal value with respect to one color other than the two kinds of color materials in a CMY value in the output CMYK signal, as for an output signal value of the first color material, the maximum value decided in the third processing step is used as a first candidate value, and, as for an output signal value of a color material different from the first color material in the two kinds of color materials, the output signal value decided in the third processing step with respect to the input signal value is used as a second candidate value;

the first candidate value and the second candidate value are adopted as output signal values in a case where a total color material amount of an output CMYK value does not exceed the total color material amount upper limit value when the first candidate value and the second candidate value are used; and the fourth processing step includes processing that decides a CMY value of the output CMYK signal such that the total color material amount matches the total color material amount upper limit value while maintaining a ratio between the first candidate value and the second candidate value, in a case where the total color material amount of the output CMYK value exceeds the total color material amount upper limit value when the first candidate value and the second candidate value are used.

10. The creation method of the total color material amount restriction table according to claim 1, wherein the fourth processing step includes processing that defines a CMY value of an output CMYK signal by performing a fourth interpolation calculation on the space of the first scale.

11. The creation method of the total color material amount restriction table according to claim 1, wherein a usage rate of a color material is used as the first scale and a signal value indicating a usage rate of each of the color materials of C, M, Y, and K is defined between 0 and 100.

12. The creation method of the total color material amount restriction table according to claim 1, wherein a color material amount represented by a volume of a color material is used as the second scale and the total color material amount upper limit value indicates an upper limit value of the volume of the color material provided per unit area.

13. A non-transitory recording medium in which computer-readable code of a program is stored, wherein the program is a program that causes a computer to realize a function of creating a total color material amount restriction table that defines a conversion relationship to convert an input CMYK signal prior to total color material amount restriction to an output CMYK signal subjected to total color material amount restriction, in order to restrict a total color material amount provided to a recording medium in an image formation apparatus that forms an image on the recording medium using color materials of cyanogen (C), magenta (M), yellow (Y) and black (K), and wherein the function comprises:

a step of acquiring a first converter that calculates a value of a color material amount represented by a second scale with a physical meaning indicating an amount of a color material provided to the recording medium by the image formation apparatus, from a signal value from the signal value represented by a first scale that defines a used amount of each of the color materials of C, M, Y, and K;

a step of acquiring a second converter that calculates a signal value represented by the first scale from the value of the color material represented by the second scale;

a step of setting a total color material amount upper limit value represented by the second scale; and a table creation processing step of creating the total color material amount restriction table that defines an output CMYK signal with a total color material amount equal to or less than the total color material amount upper limit value with respect to an input CMYK signal, using the first converter, the second converter and the total color material amount upper limit value, wherein:

the table creation processing step includes:

a first processing step of deciding an output CMYK signal corresponding to an input CMYK signal when each of signal values of C, M, and Y in the input CMYK signal is a maximum value in a domain of the signal value defined by the first scale;

a second processing step of deciding a K value of an output CMYK signal corresponding to an input CMYK signal using one or two kinds of color materials among C, M, and Y;

a third processing step of deciding a CMY value of an output CMYK signal corresponding to an input CMYK signal using one kind of color material among C, M, and Y;

a fourth processing step of deciding a CMY value of an output CMYK signal corresponding to an input CMYK signal using two kinds of color materials among C, M, and Y; and a fifth processing step of deciding a CMYK value of an output CMYK signal corresponding to an input CMYK signal using three kinds of color materials among C, M, and Y, and the fifth processing step includes processing that defines an output CMYK signal with a total color material amount equal to or less than the total color material amount upper limit value, using a total color material amount value calculated by first interpolation processing that performs an interpolation calculation in a space of a total color material amount by the second scale and a CMYK value calculated by second interpolation processing that performs an interpolation calculation in a space of the first scale.

* * * * *